US009574916B2

(12) United States Patent
Khalifa

(10) Patent No.: US 9,574,916 B2
(45) Date of Patent: Feb. 21, 2017

(54) OPTIMIZED TECHNIQUES FOR GENERATING AND MEASURING TOROIDAL VORTICES VIA AN INDUSTRIAL VORTEX FLOWMETER

(71) Applicant: Yokogawa Corporation of America, Sugar Land, TX (US)

(72) Inventor: Mohamed Khalifa, Smyrna, GA (US)

(73) Assignee: YOKOGAWA CORPORATION OF AMERICA, Sugar Land, TX (US)

( * ) Notice: Subject to any disclaimer, the term of this patent is extended or adjusted under 35 U.S.C. 154(b) by 0 days.

(21) Appl. No.: 14/952,111

(22) Filed: Nov. 25, 2015

(65) Prior Publication Data

US 2016/0084686 A1   Mar. 24, 2016

Related U.S. Application Data

(63) Continuation-in-part of application No. 14/155,078, filed on Jan. 14, 2014, now Pat. No. 9,243,940.

(60) Provisional application No. 61/857,595, filed on Jul. 23, 2013.

(51) Int. Cl.
*G01F 1/32* (2006.01)

(52) U.S. Cl.
CPC ..................... *G01F 1/32* (2013.01)

(58) Field of Classification Search
CPC .......................................... G01F 1/32
USPC ..................................... 73/861.24
See application file for complete search history.

(56) References Cited

U.S. PATENT DOCUMENTS

| | | | |
|---|---|---|---|
| 3,680,375 A | 8/1972 | Joy et al. | |
| 3,927,564 A | 12/1975 | Ketelsen | |
| 4,122,712 A * | 10/1978 | Thomas, Jr. | G01F 1/329 73/170.11 |
| 4,182,165 A * | 1/1980 | Kita | G01F 1/3254 73/861.22 |
| 4,984,470 A * | 1/1991 | Hayward | G01F 1/3218 73/861.22 |
| 5,289,726 A * | 3/1994 | Miau | G01F 1/3263 73/861.22 |
| 6,321,166 B1 * | 11/2001 | Evans | G01F 1/40 702/50 |
| 7,273,459 B2 | 9/2007 | Desilets et al. | |
| 8,234,932 B2 | 8/2012 | Tips | |

FOREIGN PATENT DOCUMENTS

WO    7900785 A1    10/1979

OTHER PUBLICATIONS

International Search Report and Written Opinion for International Application No. PCT/US2014/047833 mailed Nov. 26, 2015 (15 pgs.).

* cited by examiner

*Primary Examiner* — Jewel V Thompson
(74) *Attorney, Agent, or Firm* — Sutherland Asbill & Brennan LLP

(57) ABSTRACT

A vortex flowmeter may utilize a ring-shaped bluff body as the vortex generator or shedder. The ring shape and size of the vortex ring generator may be optimized to produce linear and stable toroidal vortex outputs that may outperform the conventional shedder bar. In comparison to the conventional vortex shedder bar, the ring may have a slimmer configuration and a higher K-factor, and hence, a higher resolution.

20 Claims, 19 Drawing Sheets

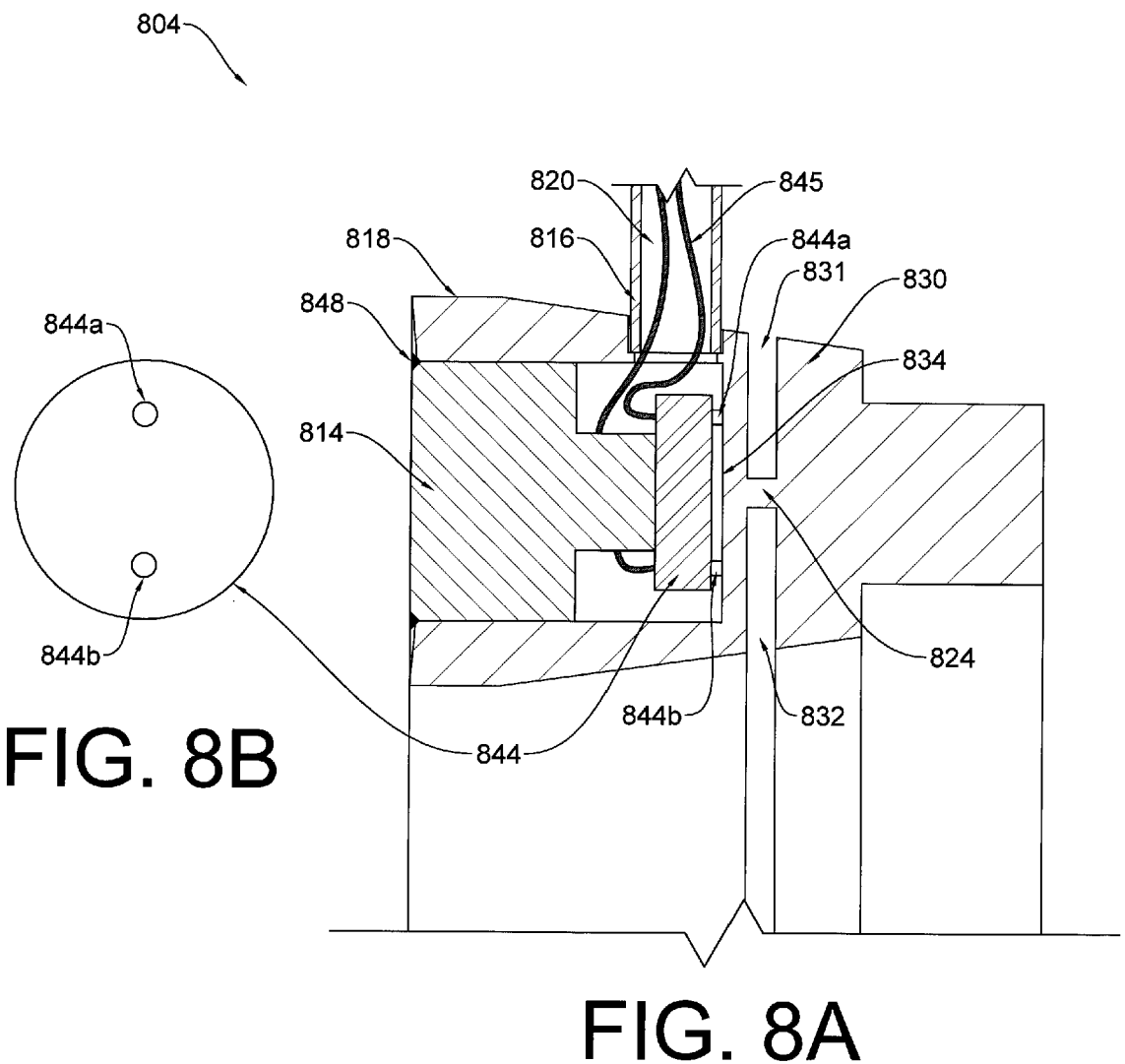

OPTIMIZED TECHNIQUES FOR GENERATING AND MEASURING TOROIDAL VORTICES VIA AN INDUSTRIAL VORTEX FLOWMETER

CROSS-REFERENCE TO RELATED APPLICATIONS

The present application is a continuation-in-part of U.S. patent application Ser. No. 14/155,078, filed Jan. 14, 2014, which claims priority to and the benefit of U.S. Provisional Patent Application No. 61/857,595, filed Jul. 23, 2013. The contents of U.S. patent application Ser. No. 14/155,078 and U.S. Provisional Patent Application No. 61/857,595 are both herein incorporated by reference in their entirety.

TECHNICAL FIELD

Embodiments of this disclosure relate generally to vortex shedding, and more particularly, to optimized configurations and techniques involving vortex ring generation for flowmeter applications.

BACKGROUND

In fluid dynamics, vortex shedding is an oscillating flow that takes place when a fluid such as air or water flows past a bluff body at certain velocities, depending on the size and shape of the bluff body. In this flow, vortices are created at the back of the body and detach periodically from either side of the body. The fluid flow past the object creates alternating low-pressure vortices on the downstream side of the object. Vortex shedding performed by conventional bluff bodies may be complicated, limited, or otherwise deficient in several aspects. Such bluff bodies may in turn limit the functionality, optimization, or otherwise the performance of vortex flowmeters.

BRIEF DESCRIPTION OF THE FIGURES

FIG. 8A illustrates a cross-sectional view of a vortex ring generator that includes embedded transducers, according to an embodiment of the disclosure.

FIG. 8B illustrates a disc portion of the embedded transducers of FIG. 8A, according to an embodiment of the disclosure.

Figure 1:
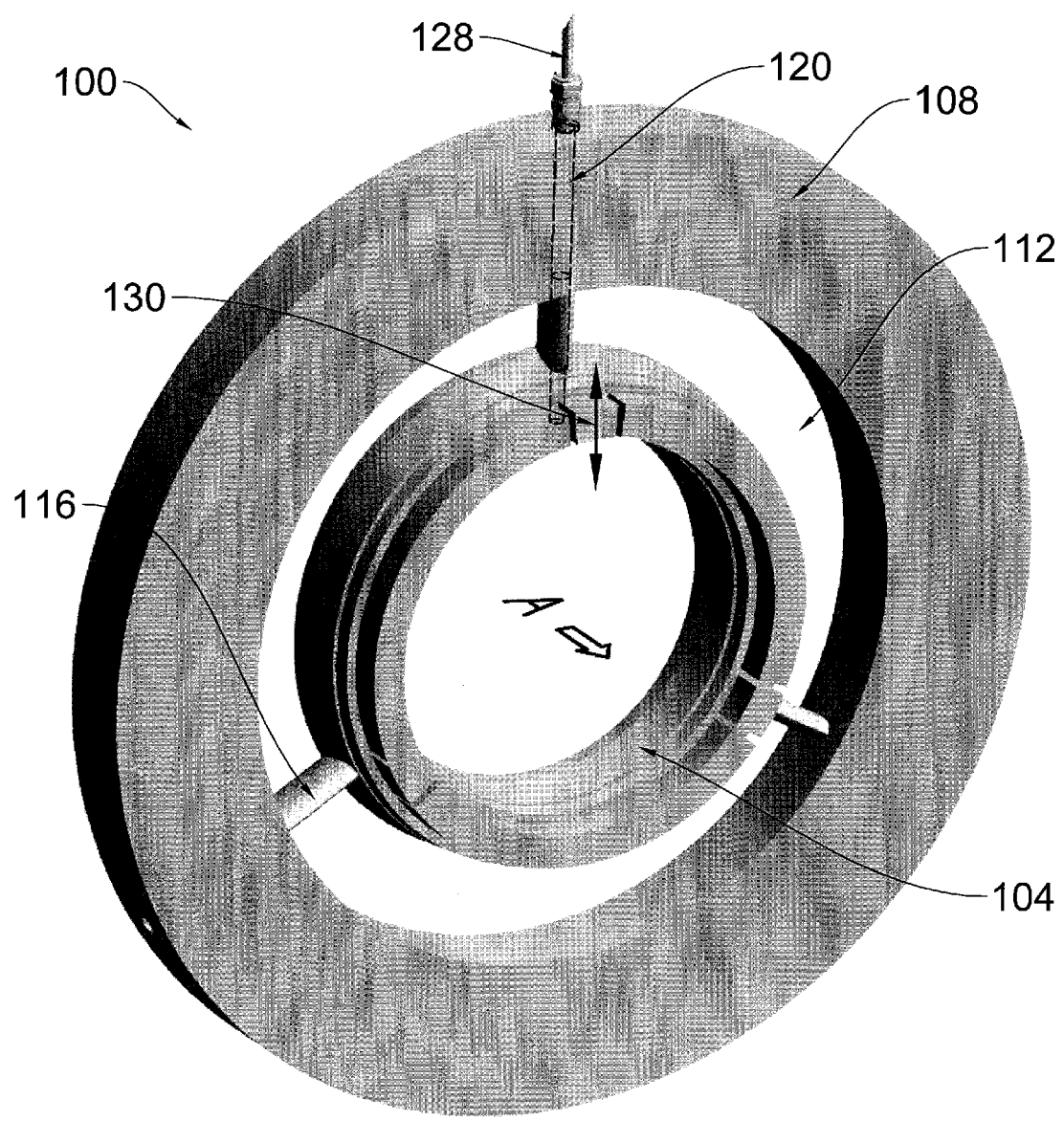
FIG. 1 illustrates a perspective view of a flowmeter, in accordance with certain embodiments of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like, but not necessarily the same or identical, elements throughout.

DETAILED DESCRIPTION OF THE EXEMPLARY EMBODIMENTS

Certain embodiments herein relate generally to vortex shedding, and more particularly, to techniques for generating and measuring toroidal vortices. Further, certain embodiments herein are directed to a vortex flowmeter that may be suitable for industrial flowmeter applications. A vortex flowmeter as described herein may include a vortex ring generator, which may be an annular or ring-shaped body that is configured to shed toroidal vortices when disposed or immersed within a fluid, such as a liquid, a gas, etc. Such a vortex flowmeter may be referred to herein as a vortex ring generator (VRG). As will be described in greater detail herein, the configuration (e.g., size, shape, etc.) of the vortex ring generator may be optimized to generate toroidal vortices that provide certain characteristics for industrial flowmeter applications, such as strong coherence, high signal-to-noise ratio (SNR), stability, repeatability, and linearity, among others.

The technical effects of certain embodiments herein may include, but are not limited to, a relatively thin shedder body size (relative to certain conventional shedder bars), which may lead to a higher shedding frequency (higher K-factor). A higher K-factor may in turn result in a higher resolution. By virtue of the K-factor being inversely proportional to the conduit diameter cubed, relatively larger conduit sizes (for example, up to 24 inches) may be used for the vortex flowmeters described herein. Due to the relatively strong coherence of the generated toroidal vortices, other technical effects may include the elimination of vortex shedding lock-in to flow/line oscillations and the minimization of upstream condition effect, which may lead to shorter upstream and downstream straight runs. The relatively slim vortex ring generator may result in less pressure drop. The axisymmetric shape of the vortex ring generator may simplify the flowmeter bore reduction (for example, to increase Reynolds number) by inserting one or more streamlined bodies at or near the center of the vortex ring generator instead of using costly pipe reducers, among other effects.

As used herein, the terms "vortex ring," "toroidal vortex," "vortex," or similar, may refer to a region of rotating fluid having a toroidal (for example, a torus or doughnut) shape. Embodiments may include an optimized vortex ring generator bluff body shape, associated sensing techniques, or both. The frequency of the toroidal vortices may be linearly proportional to the velocity of the fluid (e.g., gas or liquid) in a conduit, tube, or similar, within which the vortex ring generator is disposed. The interaction between the coaxial, but oppositely signed toroidal vortices produced by the vortex ring generator VRG may be much stronger than the vortex lines produced by conventional bluff bodies. Vortex lines, shed by a conventional bluff body, may produce a complex end effect (known as a horseshoe vortex). An optimized vortex ring generator as described herein may facilitate such performance.

The vortex ring flowmeter may also include various configurations for detecting and measuring a frequency and/or amplitude of the vortex shedding, among other things. In certain embodiments, one or more sensors may be inserted within or otherwise coupled to a cavity of the vortex ring flowmeter in various ways that facilitate the detection of one or more mechanical effects induced by the toroidal vortices, or the flow of one or more fluids, as well as the determination and elimination of noise that may impact such detection. For example, in certain embodiments described herein, vortices generated by a vortex ring generator may be measured as the vortices stress a portion of the vortex ring generator. Such a portion may include a tongue-like portion that may be formed by creating one or more slits or cut-out portions in the vortex ring generator, in one embodiment. In other embodiments, such a portion may include diaphragms or other portions both upstream and downstream of the vortex ring generator, as will be described in greater detail below.

A vortex, or a vortex's mechanical effects on certain elements in its proximity, may be sensed using one or more sensing techniques described herein. In certain embodiments, such sensing techniques may be used to determine a toroidal vortex shedding frequency, which may be linearly proportional to the velocity of the fluid (and therefore useful information in flowmeter applications). In one embodiment, density may be measured from the amplitude of the toroidal vortex signal. In another embodiment, density may be measured by using a multivariable (temperature and/or pressure) sensor mounted on the flowmeter. Redundancy in measuring any of the above variables may require the use of dual sensors mounted on the flowmeter.

Various configurations herein may be implemented for locating the sensor bodies in particular areas to facilitate such measurements, at least some of which will be described in greater detail below. For example, one or more transducers may be coupled to a sensor body or probe that may be removable, or may be more permanently embedded within a cavity (for example, a dry cavity) within a meter body (for example, a conduit portion of the meter body through which fluid may flow, which may also be referred to herein as a conduit body). The cavity may shield the sensor body from one or more fluids.

Turning now to the figures, FIG. 1 illustrates a perspective view of a flowmeter 100 including a vortex ring generator (VRG) 104, in accordance with certain embodiments of the disclosure. The VRG 104 may be a bluff body configured to generate, induce, shed, or otherwise produce toroidal vortices when the VRG 104 is disposed within a flow of one or more fluids. Such fluids may include one or a mixture of multiple types of fluids, such as one or more liquids, gases, steam, etc.

The flowmeter 100 may further include a thin, plate-like conduit body 108 having a bore 112 through which fluid may flow. Arrow A indicates the direction of fluid flow relative to flowmeter 100. The VRG 104 may be centered, approximately centered, or otherwise located within the bore 112. In certain embodiments, the VRG 104 may be substantially ring-shaped or annular. That is, the VRG 104 may be constructed or otherwise formed to resemble an axisymmetric ring that is substantially symmetrical about an axis of the VRG 104. Such an axis may be shared with the meter body 108 or a conduit portion of the meter body 108 for receiving a fluid in the direction indicated by the arrow A.

The VRG 104 may also include a relatively thin frontal and depth thicknesses as compared to that of conventional bluff bodies. Such a relatively thin frontal thickness of the VRG 104 may enable a relatively thin meter body 108, which may have the same or approximately the same thickness as a depth of the support structures or supports 116. In one embodiment, such frontal and depth thicknesses may be one-tenth of the diameter of the bore 112. In certain embodiments, the thickness of the meter body 108 may be increased to match a wafer body standard. In at least these ways, a vortex ring generator (e.g., the VRG 104) may be optimized to generate coherent toroidal vortices with a relatively higher signal-to-noise ratio as compared to that for conventional techniques, and hence, may enable more reliable measurements of the frequency and/or the amplitude of the vortex shedding or the velocity and/or the density of a fluid flow.

One or more legs or supports 116 may secure the VRG 104 to the conduit body 108. In certain embodiments, the supports 116 may be streamlined, thereby minimizing interference with the toroidal vortices. Leading and trailing edges of the supports 116, among other features, may facilitate such a streamlined configuration. The supports 116 may be streamlined in the way that they may be planar or substantially planar members and may have a first end coupled to an annular outer surface of the VRG 104 and an opposing, distal second end coupled to an inner annular surface of the meter body 108. Further, the leading edge of each support 116 may be curved and generally thinner than the trailing edge of each support 116.

In certain embodiments herein, the supports 116 may be attached to the VRG 104 on the upstream and/or downstream sides of the ring 104, where the upstream side may be the side of the VRG 104 before fluid traveling in the direction indicated by the arrow A contacts the VRG 104, and the downstream side may be the side of the VRG 104 where the fluid travels past the VRG 104 after contacting the VRG 104.

Although the flowmeter 100 shows three supports 116, fewer or more may exist in other configurations. For example, four supports may be used to secure the VRG 104 to the meter body 108. In some configurations, the number of supports 116 may vary to accommodate the number of sensor bodies desired and/or a desired rigidity of the assembly.

In some embodiments, the supports 116 may receive, host, or support, at least in part, one or more sensor bodies or probes 128. The supports 116 may additionally or alternatively be configured to receive, host, or support, at least in part, one or more embedded transducers, which may not be attached to an insertion sensor probe.

The sensor bodies or probes 128 may be inserted into a passageway 120 that may lead to a dry cavity in VRG 104. In this way, the supports 116 may include a passageway 120 or a longitudinal dry channel that may be adjacent to, or leading to, the dry cavity in the VRG 104. The sensor bodies 128 may sense any or some of the toroidal vortex mechanical effects. One of the mechanical effects may be an alternating stress (shown by the alternating arrow) on a tongue 130. Other mechanical effects may include differential pressure between the outer VRG 104 side (facing the body 108) and the inner side (facing the center of the ring). In another embodiment, the mechanical effect may be differential pressure fluctuations between the upstream and downstream sides of the VRG 104.

In one configuration, a first end of a support 116 may include a sensor body 128 that is connected to one or more processors for processing signals from the sensor body 128. A second end of the support 116 may be coupled to the dry cavity adjacent to the VRG 104. The dry passageway 120 may also host a multivariable sensor that may sense the fluid temperature and/or pressure. Dual sensors 128 may be mounted on one support 116 (e.g., within the longitudinal dry channel adjacent to the dry cavity), or on different supports 116. Examples of such configurations will be described in greater detail below.

Figure 2:
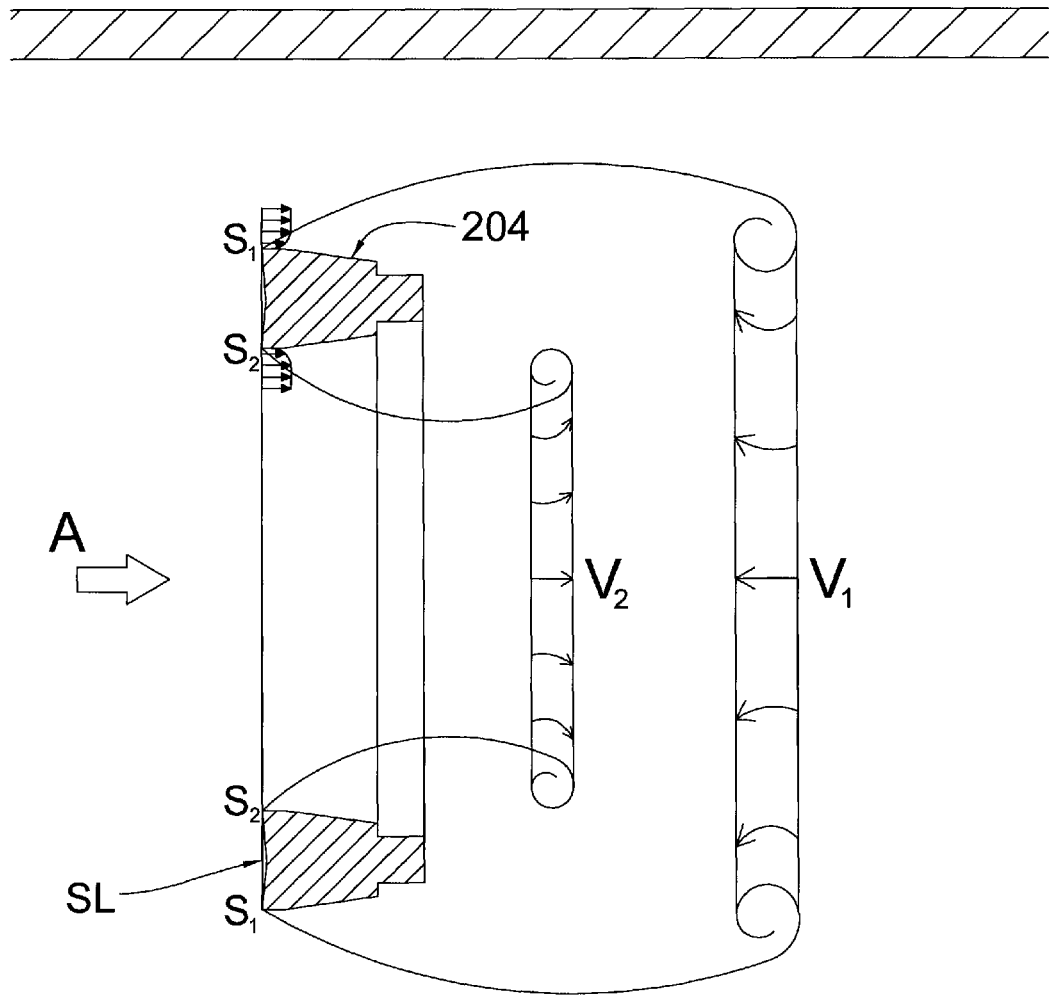
FIG. 2 illustrates the formation and alternation of toroidal vortices, according to an embodiment of the disclosure.

FIG. 2 illustrates the formation and alternation of toroidal vortices, in accordance with certain embodiments of the disclosure. Such formation and alternation may be implemented or facilitated by the VRG 204. In one embodiment, toroidal vortices may be shed in an alternating manner between the outer S1 and the inner S2 circular edges of the VRG 204. As the outer edge-induced toroidal vortex V1 starts its toroidal rotation due to the velocity gradient at the outer edge S1, the pressure in the toroidal vortex V1 may drop. As the pressure drops, the shear layer at the inner edge S2 may be pulled towards the maturing toroidal vortex V1. As a result, the first maturing toroidal vortex V1 may separate and continue traveling downstream. The bent shear layer that responded to the pressure drop may start the toroidal rotation of the inner-edge induced toroidal vortex V2. This process may repeat as the pressure at the toroidal vortex V2 drops and pulls the shear layer at the outer edge S1.

The separation lines at the outer edge S1 and the inner edge S2 may help define the initiation of the two axisymmetric shear layers and may limit the dependence on the boundary layer thickness, and hence, the dependence on the Reynolds number. Such separation lines may be relatively sharp in some embodiments. The stagnation line SL on the blunt face may be trapped by beveling the front/blunt face to stabilize the vortex shedding process, minimize jitter, and improve the signal-to-noise ratio (SNR), among other things. The back (e.g., the downstream or trailing portion) of the VRG 204 may influence or control the maturing and the alternation of the toroidal vortices shed, among other things. For example, in accordance with certain embodiments, the back of the VRG 204 may be the feedback path between the two axisymmetric shear layers in the wake of the VRG 204. The extent of the back of the VRG 204 may be optimized for a linear output at different flow rates (linearity may be defined as a linear relationship between the vortex shedding frequency and fluid velocity). For example, extending the back may delay the bending of the shear layers and consequently the separation of the toroidal vortices V1 and V2 from the edges S1 and S2 respectively. This may result in decreasing the vortex shedding frequency. On the other hand, reducing the extent of the back may contribute to increasing the vortex shedding frequency. In this way, the length of the back portion of the vortex ring generator may define a frequency of vortex shedding.

According to one configuration, a frontal upstream face of the VRG 204 may have a distance between its outer circumferential edge and its inner circumferential edge that is approximately one-third to one-half the width of a conventional bluff body. The back portion extending away from the frontal face may have a depth that is approximately one-third to one-half the depth of a conventional bluff body.

FIGS. 3A and 3B illustrate front and cross-sectional views of a flowmeter 300, according to an embodiment of the disclosure. In one embodiment, the flowmeter 300 may be embodied by the flowmeter 100 in FIG. 1. The flowmeter 300 may be configured to facilitate determining a vortex shedding frequency and/or amplitude. For example, the VRG 304 of the flowmeter 300 may include one or more fins or tongues 330. A tongue 330 may be stressed by toroidal vortices. As will be described in greater detail below, one or more slits that form the tongue 330 may be added to the VRG 304 to intensify the stress resulting from the passage of the vortices. In one embodiment, the tongue 330 may extend from a relatively narrow portion 324, which may be less resistive to stresses acting on the tongue 330 caused by toroidal vortices relative to other portions of the VRG 304.

The relatively narrow portion 324 may connect the tongue 330 to the main VRG 304 ring body.

To form the tongue 330, radial slits 335 may be introduced in the VRG 304. FIG. 3B indicates circumferential slits 331 and 332 that may further contribute to the formation of the tongue 330 and the relatively narrow portion 324. The combination of the radial slits 335 and the circumferential slits 331 and 332 may carve out the tongue 330 from a downstream portion or trailing edge of the VRG 304, in one embodiment. The extension of the tongue 330 from the portion 324 may therefore be implemented at least in part by removing material from the VRG 304 where the radial slits 335 and the circumferential slits 331 and 332 are indicated. Such a configuration of the radial slits 335 and the circumferential slits 331 and 332, among other things, may facilitate translation of the stresses acting on the tongue 330 into a measurable strain. The widths of the slits 331, 332, and 335 may be minimized in certain embodiments herein to avoid altering an optimized ring shape.

FIG. 3B shows an insertion sensor probe 328, according to an embodiment of the disclosure. In one embodiment, the wall of the cavity 320 may abut or be adjacent to the portion 324. The portion 324 may extend from the cavity wall towards the tongue 330, in one configuration.

From outside the meter body 308, the sensor 328 may be introduced via one or a series of through dry holes 320 defined by the conduit portion of the meter body 308 and a support 316. In this way, the sensor probe, and one or more associated transducers, may be inserted into the VRG 304. In one configuration, the through hole defined by the support 316 may span the longitudinal length of the support 316 and may be substantially aligned with the cavity 320 such that the sensor probe 328 may be passed through the support 316 and disposed, at least in part, within the cavity 320 without exposure to the fluid(s) in which the flowmeter 300 may be disposed. More details on such insertion sensors 328 will be provided in association with FIGS. 4-7.

In another embodiment, a more permanent sensor installation 344 may be embedded inside the cavity 320, which may be a dry cavity. The sensor 344 may be secured to the cavity 320 at least in part by weldments 348, in some embodiments. More details on such embedded sensors 344 will be provided in association with FIGS. 8 to 10.

In some embodiments, the vortex flowmeter 300 may also, or as an alternative, include multivariable sensors. The multivariable sensors may measure temperature, pressure, etc., in various embodiments. The multivariable sensors may be mounted according to various configurations. In one embodiment, the multivariable sensors may be mounted on the VRG 304 in the same or similar way that the strain transducers 328 and/or 344 may be mounted in the cavity 320, which may be a dry cavity. In other embodiments, at least one of a temperature sensor and/or a pressure sensor may be mounted within, on, or coupled to the streamlined support 316. For embodiments that involve a temperature probe, the cavity 320 may act as a thermo-well. In one embodiment, static pressure may be measured through a port 356 in the support 316, in the ring 304, or in the body 308. The port 356 may be equipped with an isolation diaphragm, in one embodiment, as will be described in greater detail below.

Certain embodiments may provide for multiple (e.g., dual) sensor bodies 328 or 344 configured to provide redundant readings, for example, in critical applications or in applications where a line may receive multiple types of fluids (e.g., gas, liquid, or combinations thereof) at different times. In addition to redundancy, dual sensor bodies may improve the range and accuracy of the flowmeter as the parameters for each sensor body may be optimized for a limited portion of the flow range. For example, a first sensor may sense a first portion of the flow range of the flowmeter, while a second sensor may sense a different, second portion of the flow range of the flowmeter.

In certain embodiments herein, the sensor bodies (e.g., the sensor body 328 and the sensor body 344) may each include one or more transducers. According to one example, one sensor body may include two transducers that may be used to cancel the common mode noise, among other things, while another sensor body may include only one transducer for sensing toroidal vortices. Any number of transducers used in conjunction with a sensor body, or without a sensor body, may be used in other embodiments.

Figure 3:
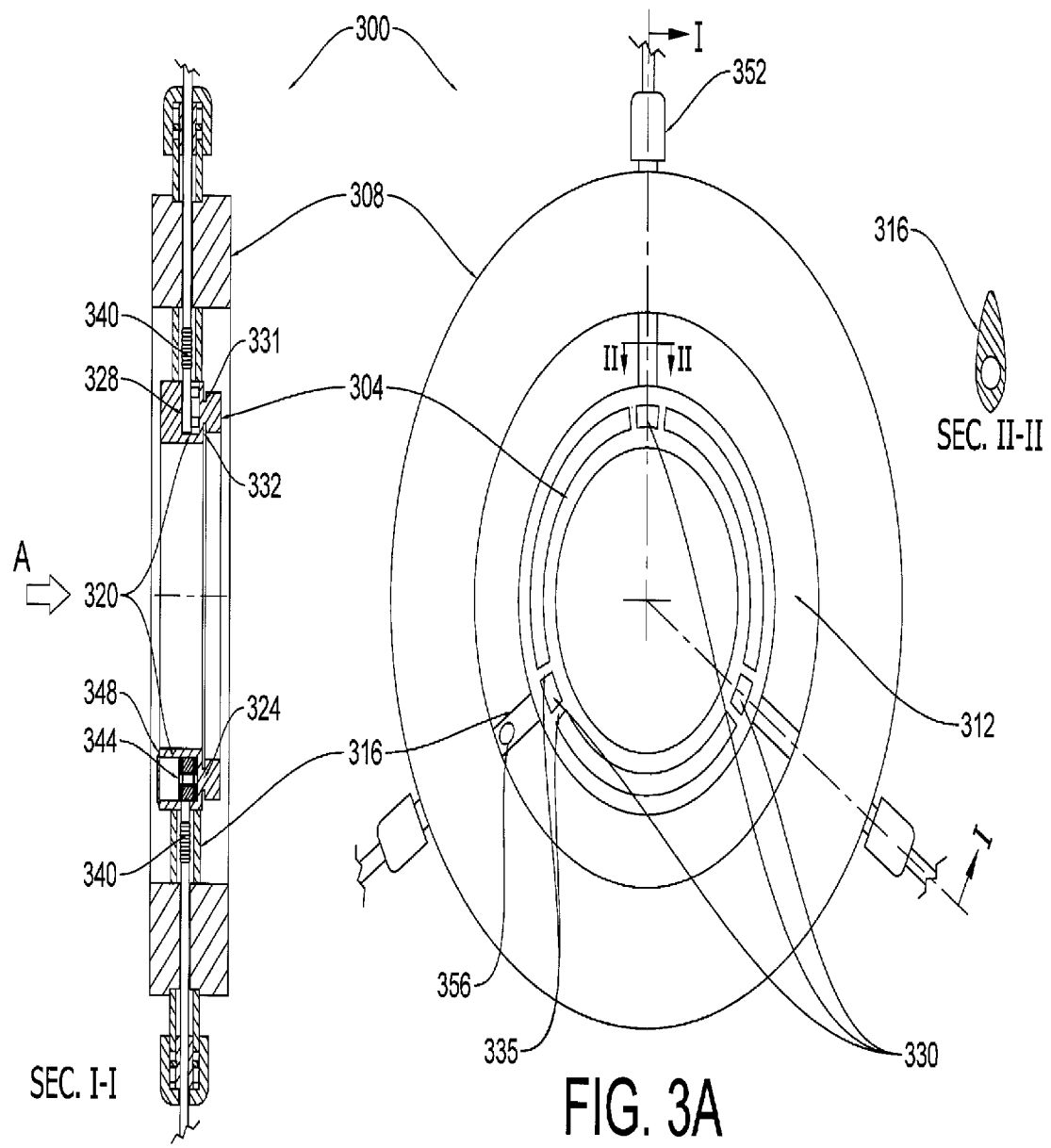
FIG. 3A illustrates a front view of a flowmeter, according to an embodiment of the disclosure.
FIG. 3B illustrates a cross-sectional view of the flowmeter of FIG. 3A, according to an embodiment of the disclosure.

In some embodiments, multiple sensor bodies may be used in conjunction with multiple tongues, for example, one sensor body per tongue. In one example, a sensor body may include a first transducer for detecting strain resulting from stress acting on a first side of the tongue 330 and a second transducer for detecting strain resulting from stress acting on a second side of the tongue 330. FIG. 3 illustrates multiple tongues 330. A sensor probe 328 configured in such a way may be capable of sensing toroidal vortices' frequency and amplitude. In some embodiments, such as embodiments that involve a measurement of temperature and/or pressure, tongues like the tongue 330 may not exist.

In some embodiments, the sensor bodies 328 and 344 may also include means for strain relief 340, such as ridges, for protecting the sensor bodies 328 and 344 against external noise (for example, line vibration noise). In certain embodiments, a compression fitting 352 may be configured to hold the insertion sensor probe 328 in place relative to at least one of the conduit portion of the meter body 308 or the VRG 304. The compression fitting 352 may not be used for pressure containment because it may not be rated for the pressure, in some embodiments. Since the cavity 320 hosting the sensor 328 may be dry, the compression fitting 352 may also not be wet, in one embodiment.

In certain configurations, the sensor probe 328 may be removable from the flowmeter 300 such that the one or more transducers thereon may be accessed and replaced in the field without depressurizing the line on which the flowmeter 300 may be installed. Further, such a configuration may eliminate the need to recalibrate the flowmeter 300 when the transducers on the sensor probe 328 are changed. These configurations may be characterized herein as "insertion" or "replaceable" type sensor bodies or probes. According to these configurations, the streamlined supports 316 may act as a dry passageway to communicate the transducers' signals to one or more processors, which may be located outside of the flowmeter 300.

To replace the sensor probe 328, the compression fitting 352 may be released or removed from the insertion sensor probe 328, thereby allowing the insertion sensor probe at least one degree of freedom. For example, releasing the compression fitting 352 may allow the insertion sensor probe 328 to be pulled out axially from the through holes. Once the insertion sensor probe 328 is extracted from the flowmeter 300, it may be accessible for maintenance or replacement. The insertion sensor probe 328 may then be re-inserted into the flowmeter 300 and the compression fitting 352 may be re-applied to secure the insertion sensor probe 328 in a fixed position relative to at least one of the conduit body 308 or the VRG 304. In certain embodiments, calibration of the flowmeter 300 may depend solely on the flowmeter bore 312 and the geometry of the VRG 304. As these parameters may be unaffected by the removal of the insertion sensor probe 328, the transducers on the sensor probe 328 may be accessed without having to recalibrate the flowmeter 300.

Some configurations may not facilitate removal of or accessibility to sensor bodies and their associated transducers, for example, without altering the VRG 304. Such configurations may be referred to herein as "embedded" sensors. "Embedded" sensor bodies 344 may involve a greater degree of work to remove, replace, or otherwise access the transducers coupled to such sensor bodies as compared to the insertion/replaceable type configurations. The sensor body 344 embedded within the dry cavity 320 by weldments 348 may be an embedded sensor as referred to herein.

Figure 4:
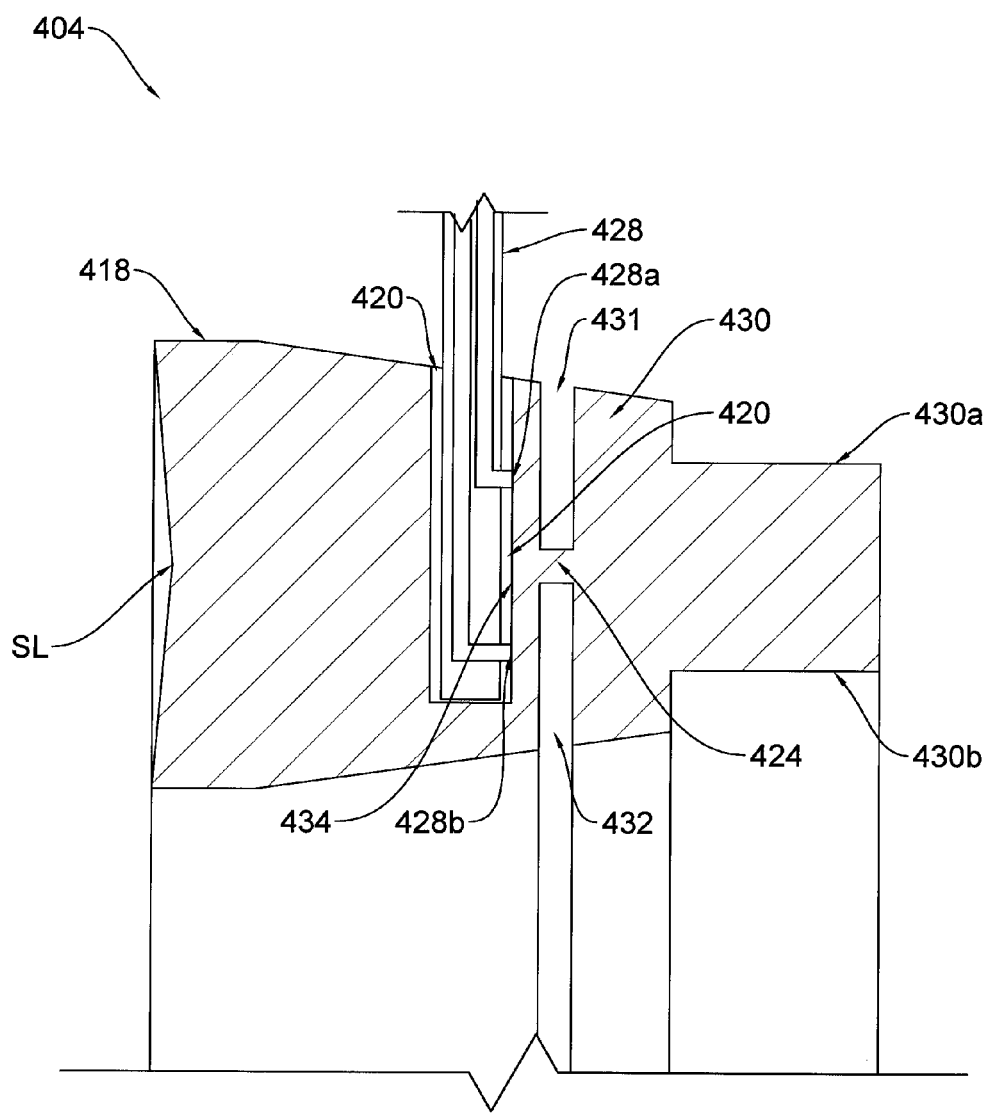
FIG. 4 illustrates a cross-sectional view of a vortex ring generator that includes an insertion sensor probe, according to an embodiment of the disclosure.

FIG. 4 illustrates a cross-sectional view of a portion of the vortex ring 404 that corresponds to VRG 304 in FIG. 3. In certain embodiments, the strain induced by the toroidal vortices' mechanical effects, may be measured by a sensor body that includes one or more transducers. In one embodiment, one or more transducers of the sensor body 428 may measure the strain at or near the portion 424 of the tongue 430. The portion 424 may include various sizes, thicknesses, or dimensions in various embodiments.

The one or more transducers (for example, the transducers 428a and 428b) may be associated with a sensor body or probe 428, which will be described in greater detail below. In one embodiment, the transducers 428a and 428b may include reflective, fiber optic transducers. In certain embodiments, the transducers 428a and 428b may be configured to sense or detect changes in light that may be indicative of strain at a cavity wall (for example, the cavity wall 434), which may define at least a portion of a dry cavity 420 in the VRG 404.

According to one configuration, a first transducer 428a may be disposed within the cavity 420 such that the first transducer 428a may detect strain resulting from stress acting on a first side of the tongue 430a or 430b at or near the cavity wall 434. The second transducer 428b may be disposed within the dry cavity 420 such that the second transducer 428b may detect strain resulting from stress acting on the second side of the tongue 430a or 430b at or near the cavity wall 434. Within the dry cavity 420, therefore, the transducers 428a and/or 428b, or another strain transducer, may detect the cyclic alternation of the stress on the tongue. In this or similar arrangements, common mode noise, such as that caused by line vibration, may be canceled by subtracting the signals from the two transducers 428a and 428b from each other.

Although two transducers 428a and 428b are described in the present example, fewer or more transducers in a variety of types and/or arrangements suitable for detecting one or more mechanical effects induced by the toroidal vortices generated by the VRG 404 may exist in other configurations.

As described, the transducers 428a and 428b may be attached to, in connection with, or otherwise associated with the sensor body or probe 428. The sensor probe 428 may be inserted into within the cavity 420 formed within the VRG 404. In one embodiment, the sensor probe 428 may be at least partially disposed within the cavity 420. FIG. 3 describes example techniques for introducing the sensor probe 428 into the dry cavity 420.

In one embodiment, the fiber optic sensor body 428 may use the "near side" reflective technology. The near side reflective technology may require that the fiber optic sensor body be relatively close to a surface, such as a wall 434 in the cavity 420. In one example, the fiber optic sensor body may be approximately 40 to 80 microns away from the cavity wall 434. Various other distances from such a cavity wall or other surfaces may be suitable in other embodiments. A sensitivity of 100 Mv/μm of the near side measurements may exceed that of a Piezo transducer and may be more suitable for strain measurements, in certain embodiments. In another embodiment, the fiber optic sensor may be used in extreme (high and low) temperatures. In one embodiment, each of the fiber optic transducers 428a and 428b may include a fiber bundle in which at least a portion of the fiber optic strands in the bundle may emit light that is reflected off of the cavity wall 434 or other surface. At least another portion of the fiber optic strands in the fiber bundle may receive the reflected light.

As described, the vortex ring generator 404 may include a tongue 430 that may include a flat side 418 that may fix the shear layer separation lines.

Figure 5:
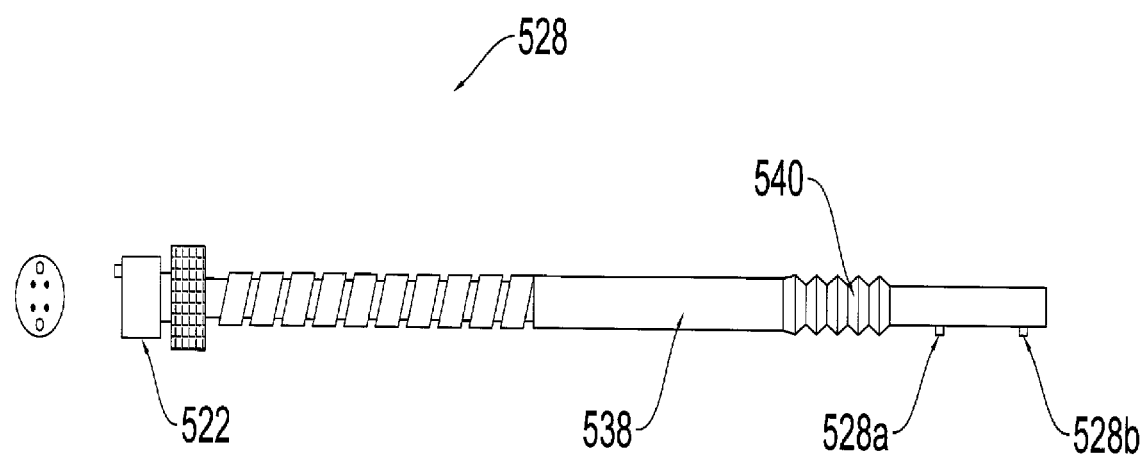
FIG. 5 illustrates certain features of the insertion sensor probe of FIG. 4, according to an embodiment of the disclosure.

FIG. 5 illustrates an example sensor body or probe 528, which may embody the sensor body or probe 428 in FIG. 4 for measuring the frequency and/or the amplitude of toroidal vortices in the embodiment of FIG. 4. As shown, the sensor probe may include two transducers 528a and 528b. In one embodiment, the sensor probe 528 may be an insertion probe and may also be a fiber optic probe in certain embodiments herein. The sensor probe 528 may include a connector or coupling 522. The coupling 522 may be located at or near an end of the sensor probe 528. The coupling 522 may be configured to connect and/or interface the transducers 528a and 528b to one or more processors (not shown), which may be provided locally (for example, at or near the flowmeter) or at a remote location, for processing signals from the transducers. Some embodiments may be directed to integral flowmeters in which the processor may be mounted directly on the flowmeter body. A coupling 522 may not exist in such integral flowmeter embodiments. For the compression fitting 352 clamping explained in FIG. 3, the section 538 may be added to the sensor probe 528, in one embodiment. The stress relief portion 540 may minimize the line vibration effect on the transducers 528a and 528b.

The one or more processors may be configured to receive signals transmitted by the transducers 528a and 528b. The signals may convey raw information detected by the transducers 528a and 528b, which may be processed by the one or more processors into information that may be useful for certain applications, including industrial flowmeter applications. For example, the one or more processors may scale the output of the transducers 528a and 528b to a desired unit of measurement. Although two transducers are described as interfacing with the one or more processors, fewer or more transducers may interface with the one or more processors in other examples.

In certain embodiments herein, the one or more processors may be associated with one or more computing devices, which may also include one or more memories; input/output (I/O) devices, such as a keyboard, mouse, etc.; communication connections, such as network cards, wireless transmission interfaces, etc.; data stores, such as databases, arrays, lists, etc.; as well as other components.

As used herein, the term "device" may refer to any computing component that includes one or more processors that can be configured to execute computer-readable, computer-implemented, or computer-executable instructions. Example devices may include flowmeters (such as vortex flowmeters), temperature and pressure (multi variable meters), personal computers, server computers, server farms, digital assistants, smart phones, personal digital assistants, digital tablets, smart cards, Internet appliances, application-specific circuits, microcontrollers, minicomputers, transceivers, kiosks, or other processor-based devices. The execution of suitable computer-implemented instructions by one or more processors associated with various devices may form special purpose computers or other particular machines that may implement or facilitate the processes described herein.

Figure 6:
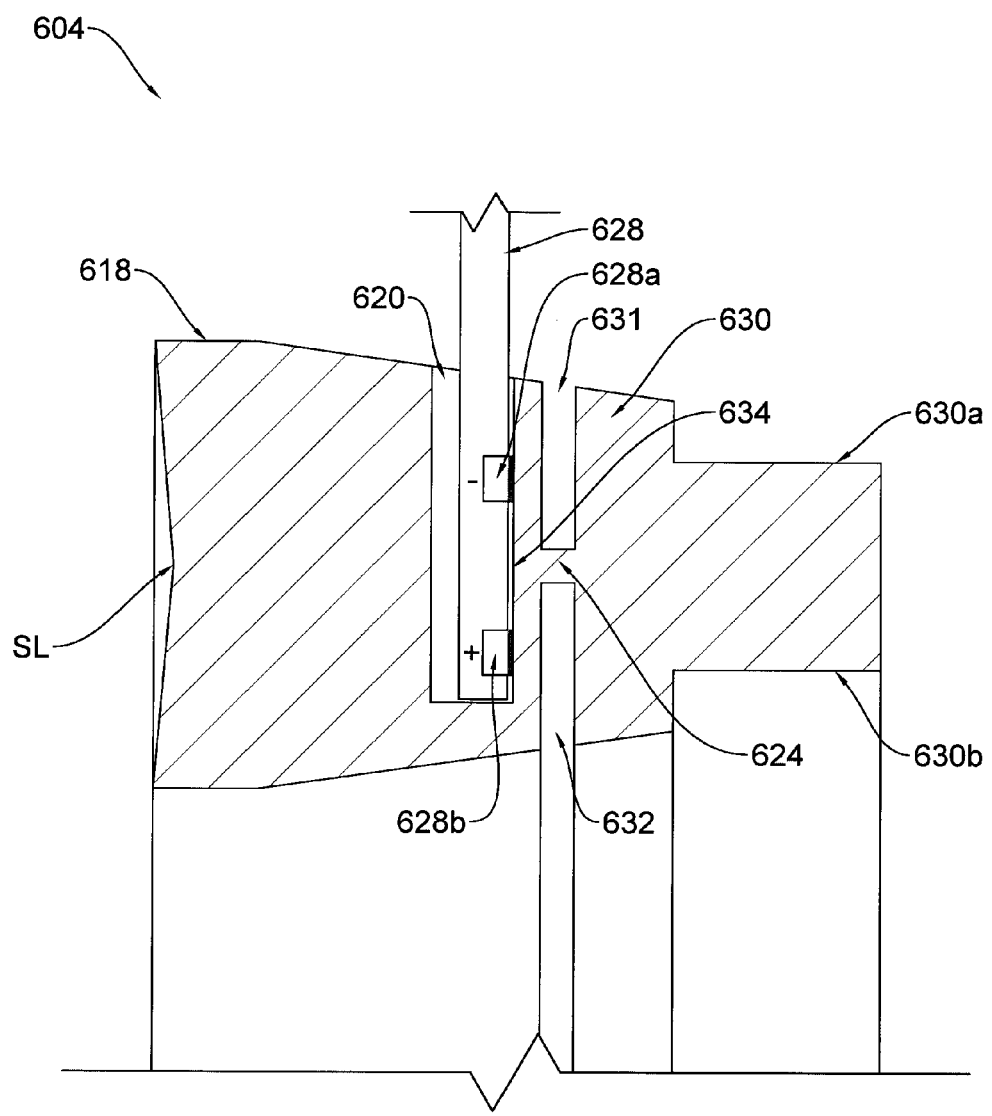
FIG. 6 illustrates a cross-sectional view of a vortex ring generator that includes a piezoelectric insertion sensor probe, according to an embodiment of the disclosure.

FIG. 6 illustrates a cross-section of a vortex ring generator (VRG) 604 and a sensor body or probe 628, which may be a piezoelectric probe in one embodiment. The sensor probe 628 may include transducers 628a and 628b, in one embodiment. The transducers 628a and 628b may be configured to measure or otherwise facilitate the determination of one or more strain values at or near the narrow portion 624 of the VRG 604. The sensor probe 628 may be at least partially disposed within the cavity 620, in one embodiment. In certain embodiments, the transducers 628a and 628b may be configured to sense or detect strain at the cavity wall 634 using the piezoelectric effect. The transducers may be firmly secured in the cavity 620 and may be coupled to, attached to, or otherwise in contact (e.g., strong contact) with the wall 634, in some embodiments. Also depicted in FIG. 6 are components of the VRG 604 described above at least in FIGS. 3 and 4, where such components in FIG. 6 have the same numeral as like components in FIGS. 3 and 4.

In one configuration, the sensor body or probe 628 may include a first transducer 628a and a second transducer 628b. The first transducer 628a may be disposed within a dry cavity 620 such that the first transducer 628a may detect the cavity wall 634 strain resulting from stress acting on a first side of the tongue 630a. The second transducer 628b may detect the cavity wall 634 strain resulting from stress acting on the second side of the tongue 630b. Although two transducers are shown in FIG. 6, any number of transducers in a variety of types and/or arrangements suitable for detecting one or more mechanical effects induced by the toroidal vortices generated by the VRG 604, including piezoelectric transducers may exist in other embodiments.

In one embodiment, the two transducers 628a and 628b may be used to cancel extrinsic common mode noise. According to one example, the first transducer 628a and the second transducer 628b may have opposite polarities. Due to the opposite polarities, the signals from the two transducers 628a and 628b may be summed to eliminate extrinsic common mode noise (for example, the positive signal (+) may nullify the negative signal (−)). At the same time, the differential mode due to toroidal vortices adds up (for example, a negative strain on a negative polarity may yield a positive output). In other examples, such as those in which the signals from the two transducers 628a and 628b do not have opposite polarities, the signals from the two transducers 628a and 628b may be subtracted to eliminate the common mode noise.

Figure 7:
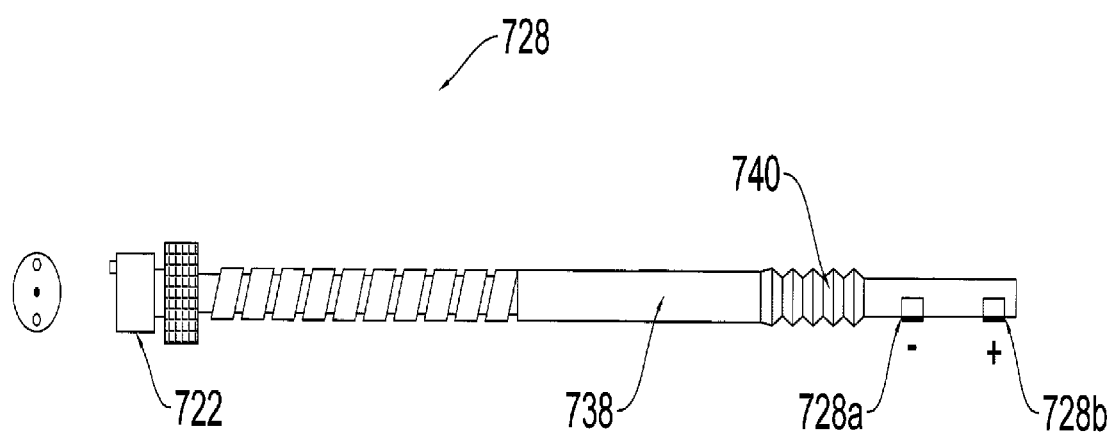
FIG. 7 illustrates certain features of the sensor probe of FIG. 6, according to an embodiment of the disclosure.

FIG. 7 illustrates an example sensor probe 728, which may be embodied by the sensor body or probe 628 in FIG. 6 for measuring the frequency and/or the amplitude of toroidal vortices in the embodiment of FIG. 6. As shown, the sensor probe may include two transducers 728a and 728b. In one embodiment, the sensor probe 728 may be an insertion probe and may also be a piezo probe in certain embodiments herein. The sensor probe 728 may include a connector or coupling 722. The coupling 722 may be located at or near an end of the sensor probe 728. The coupling 722 may be configured to connect and/or interface the transducers 728a and 728b to one or more processors (not shown), which may be provided locally (for example, at or near the flowmeter) or at a remote location. Some embodiments may be directed to integral flowmeters in which the processor may be mounted directly on the flowmeter body. A coupling 722 may not exist in such integral flowmeter embodiments.

The one or more processors may be configured to receive signals transmitted by the transducers 728a and 728b. The signals may convey raw information detected by the transducers 728a and 728b, which may be processed by the one or more processors into information that may be useful for certain applications, including industrial flowmeter applications. For example, the one or more processors may scale the output of the transducers 728a and 728b to a desired unit of measurement. Although two transducers are described as interfacing with the one or more processors, fewer or more transducers may interface with the one or more processors in other examples. In one embodiment, the one or more processors may scale a first signal (e.g., the output of the transducer 728a) to cancel extrinsic noise. In so doing, the one or more processors may subtract a second signal (e.g., the output of the transducer 728b) from the scaled first signal 728a.

FIG. 8A illustrates a cross-section of a vortex ring generator (VRG) 804 that includes embedded transducers 844a and 844b, according to an embodiment of the disclosure. In one embodiment, the transducers 844a and 844b may be reflective, fiber optic transducers. The transducers 844a and 844b may further be coupled to, attached to, or in connection with an embedded sensor probe that may be embedded in the dry cavity 820, or put another way, may not be easily removed from the cavity 820. In other embodiments, such as those associated with the insertion sensor 628 in FIG. 6, the sensor probe may be removed from the cavity 620 (for example, relatively easily as compared to the embedded transducers 844a and 844b, at least a portion of which may be welded via weldments 848 to at least a portion of the cavity 820 or other structure).

In one embodiment, the transducers 844a and 844b may be embedded, fiber optic transducers that are arranged on a disc 844 as shown in FIG. 8B. The disc 844 may support a particular placement and exposure of the embedded fiber optic transducers 844a and 844b relative to at least one of the cavity wall 834, the narrow portion 824, or the tongue 830. In some embodiments, the disc 844 may be disposed within the cavity 820. Two fiber bundles 845 may be introduced through the support 816 and attached to, or in connection with, the disc 844 such that the sensing fiber optic transducer "eyes" 844a and 844b may be exposed and oriented towards the cavity wall 834. Accordingly, the fiber optic transducers 844a and 844b may be sandwiched between the disc 844 and the cavity wall 834 in certain embodiments. Although two fiber bundles are illustrated in FIG. 8, any number of fibers may be used in other configurations.

Installation of the transducers 844a and 844b may further involve providing at least one spacer 814 configured to firmly hold the disc 844 in a certain position. In certain embodiments, the spacer 814 may have one or more surfaces that are exposed in a direction upstream of the VRG 804. The exposed surfaces may provide at least a portion of the frontal thickness of the VRG 804. The spacer 814 may be fixed to the VRG 804 via weldments 848 or any other fastener, adhesive, etc., suitable for fixing the spacer 814 to the VRG 804. In some embodiments, access to the transducers 844a and 844b may require destruction of the weldment 848 and/or the spacer 814.

Figures 9A, 9B:
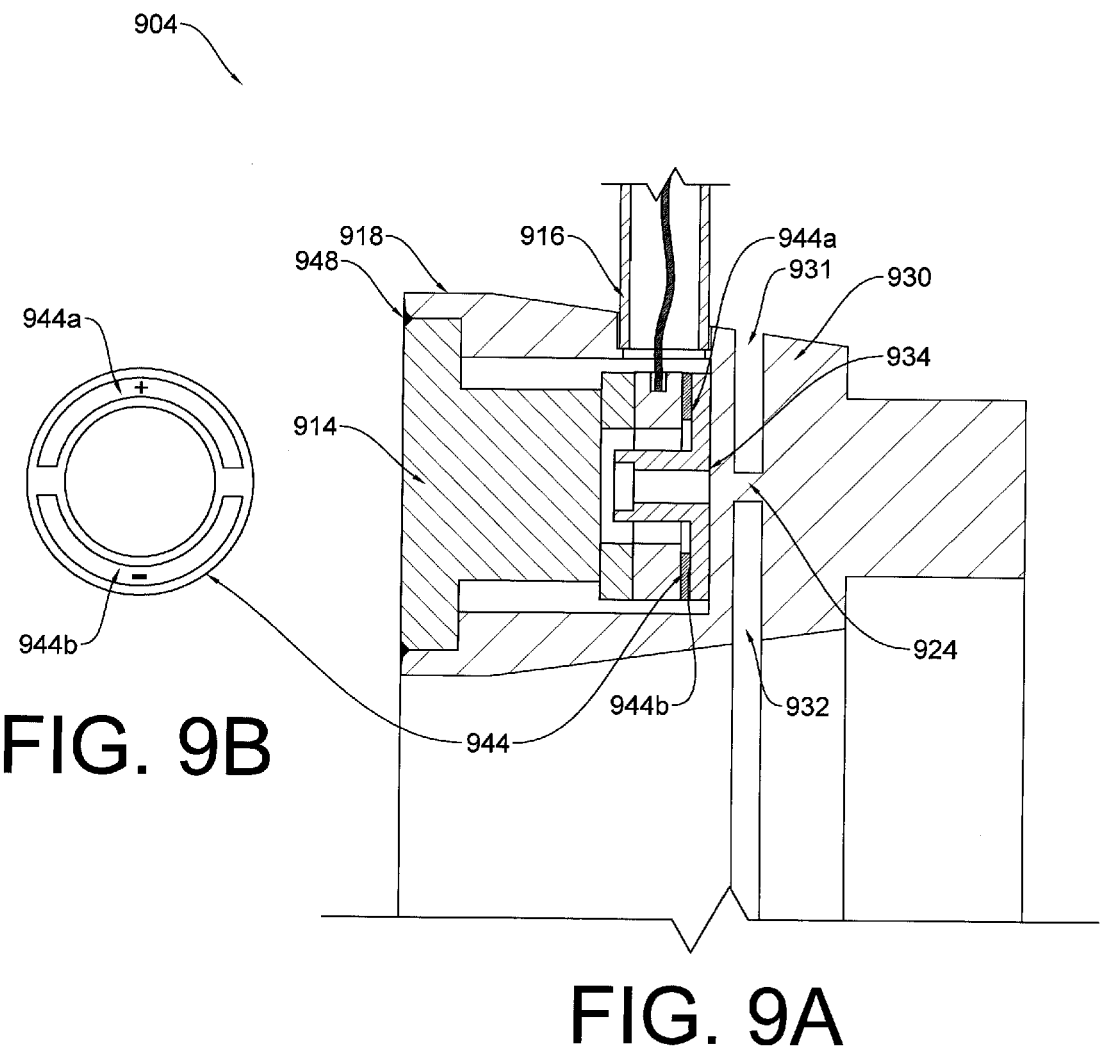
FIG. 9A illustrates a cross-sectional view of a vortex ring generator that includes embedded transducers, according to an embodiment of the disclosure.
FIG. 9B illustrates in further detail an arrangement of transducers embedded in a portion of the vortex ring generator of FIG. 9A, according to an embodiment of the disclosure.

FIG. 9A illustrates a cross-section of a vortex ring generator (VRG) 904 including embedded transducers 944a and 944b, according to an embodiment of the disclosure. The embedded transducers 944a and 944b may be piezoelectric transducers, such as the piezoelectric transducers 628a and 628b described above with reference to FIG. 6. In one configuration, rather than being provided on an insertion sensor probe, the piezoelectric transducers 944a and 944b may be provided on an embedded sensor body such that the transducers 944a and 944b may not be easily removed or accessed.

Similar to the embedded fiber optic transducers 844a and 844b described above with reference to FIG. 8, the embedded piezoelectric transducers 944a and 944b of FIG. 9 may be arranged on a disc 944. The disc 944 may support a particular placement and exposure of the embedded piezoelectric transducers 944a and 944b relative to at least one of the cavity wall 934, the portion 924, or the tongue 930. FIG. 9B also illustrates an arrangement of the transducers 944a and 944b embedded in a disc 944, according to an embodiment of the disclosure.

Figure 10:
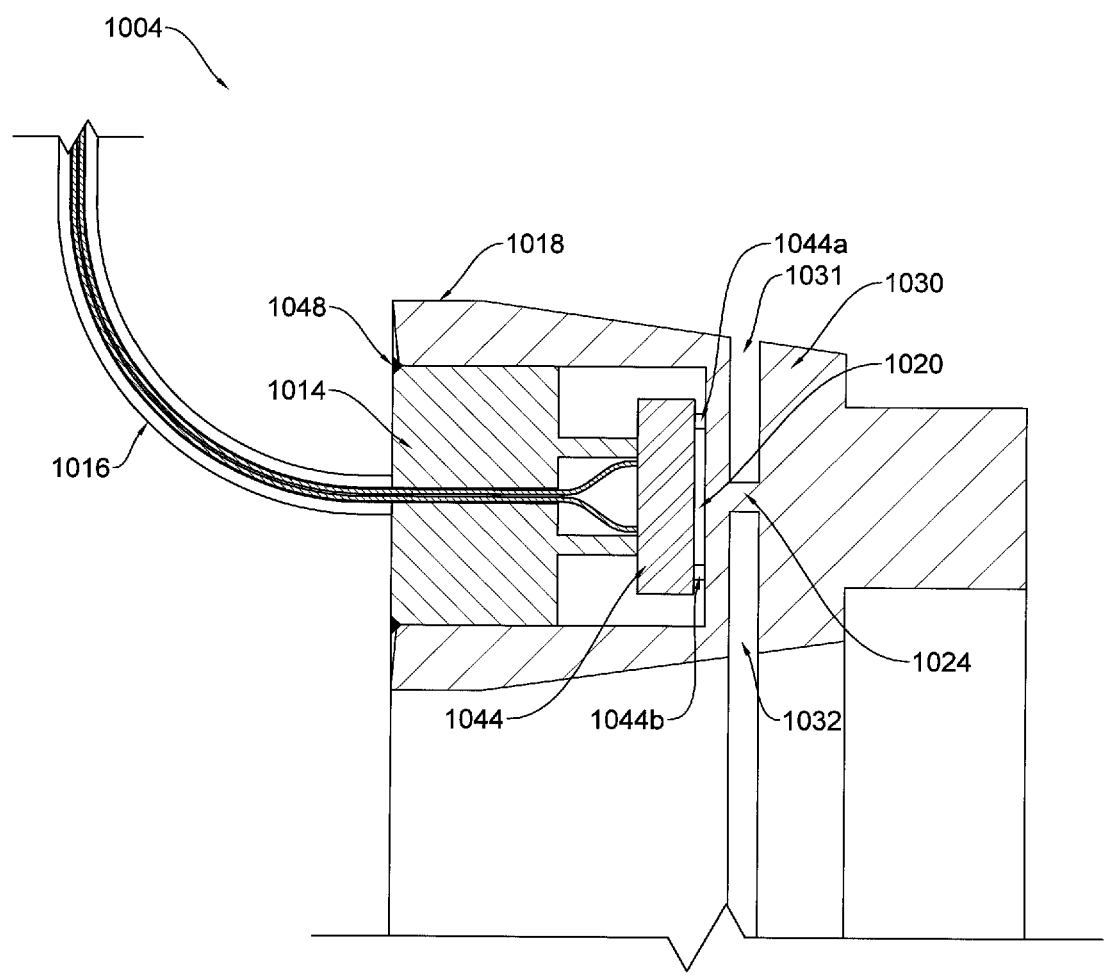
FIG. 10 illustrates a cross-sectional view of a vortex ring generator including embedded transducers and a support configuration, according to an embodiment of the disclosure.

FIG. 10 illustrates a cross-section of a vortex ring generator (VRG) 1004 including embedded transducers 1044a and 1044b, and a support 1016, according to an embodiment of the disclosure. The support 1016 may also support the transducers 1044a and 1044b. In some embodiments, the support 1016 may be integral with a spacer portion 1014. In other embodiments, the support 1016 may be constructed as a separate component that is attached to a spacer 1014. In one configuration, the support 1016 may extend away from the VRG 1004. For example, the support 1016 may extend away from the front of the VRG 1004 in an upstream direction. The transducers 1044a and 1044b may be fiber optics (as shown in FIG. 8) or Piezo (as shown in FIG. 9).

Figures 11A, 11B:
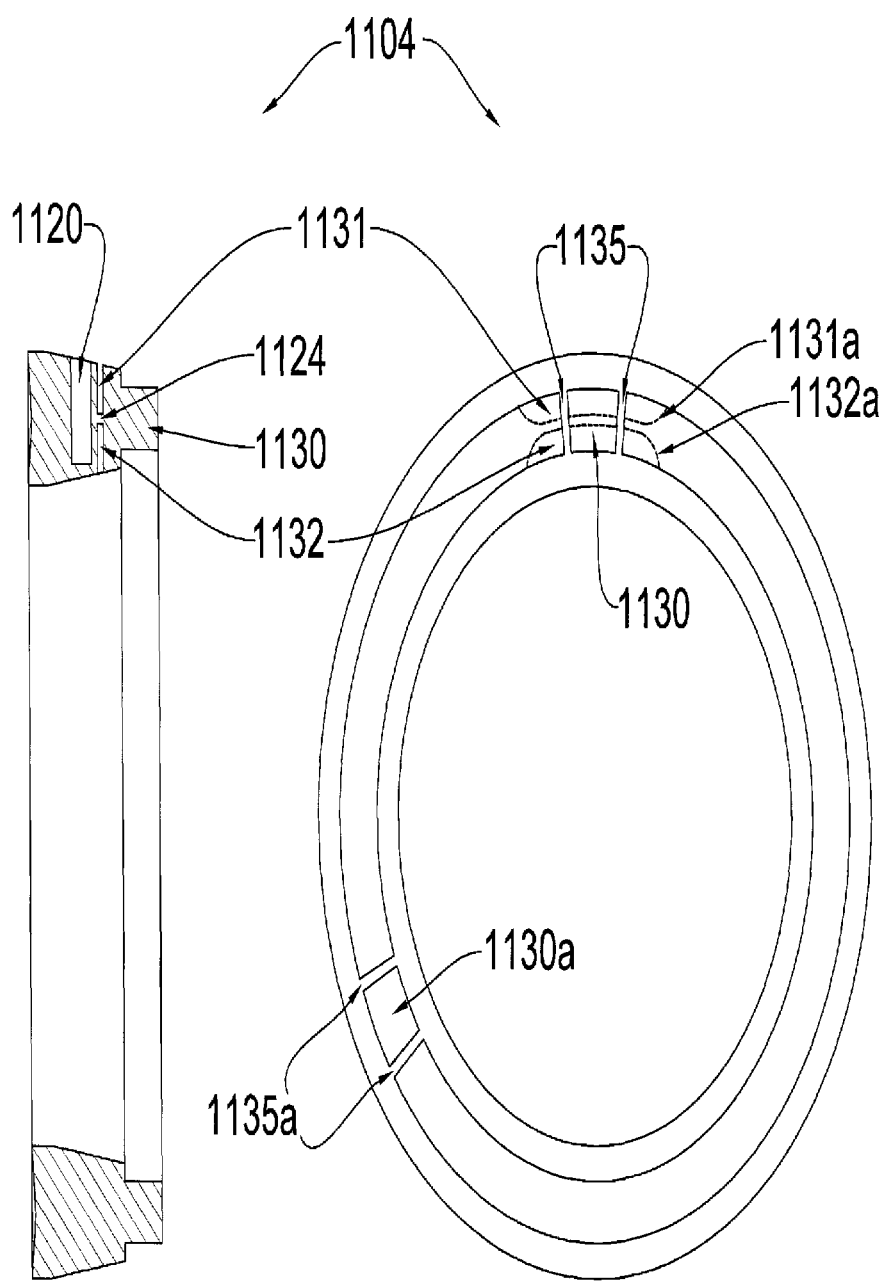
FIG. 11A illustrates a front view of a vortex ring generator illustrating an alternative slit arrangement, according to an embodiment of the disclosure.
FIG. 11B illustrates a cross-sectional view of the vortex ring generator of FIG. 11A, according to an embodiment of the disclosure.

Turning now to FIGS. 11A and 11B, a vortex ring generator (VRG) 1104 having an alternative slit arrangement in accordance with certain embodiments of the disclosure is provided. The slits 1131 and 1132 may be introduced locally rather than spanning the complete circumference of the VRG 1104, in one embodiment. Such a slit configuration may be useful, for example, in circumstances in which implementing multiple slits circumferentially may be difficult, as may be the case when the flowmeter is cast as a single piece (for example, when the body, the supports, and the VRG 1104 are formed as an integral unit). Radial slits 1135 may be included to contribute to the formation of the tongue 1130.

The length of the slits 1131 and 1132 may vary relative to the length of the tongue 1130. In some embodiments, the slits 1131 and 1132 may be about the same length as the tongue 1130, while in other embodiments the length of the slits 1131 and 1132 may be slightly greater than the length of the tongue 1130. The type of terminations 1131a and 1132a of the slits 1131 and 1132 may depend on the cutting tool used to create the slits 1131a and 1132a, in one embodiment.

The location(s) of the slits 1135, 1131, and 1132 may vary. According to certain embodiments, the slits 1131 and 1132 may be located in a downstream portion of the VRG 1104 to facilitate a sturdier support structure (such as the supports 316 in FIG. 3A). In some embodiments, however, the slits 1131 and 1132 may be located in an upstream portion of the VRG 1104. In certain embodiments, the strain value measurable in the cavity 1120 may increase progressively the further upstream the slits 1131 and 1132 are created. The portion 1124 of the VRG 1104 may correspondingly be moved further upstream. The reason for the strain increase as the slits 1131 and 1132 move upstream may be attributed to the increase in the tongue surface area, resulting in an increase in the force due to the passage of a toroidal vortex.

In some embodiments, the slits 1135 may be slanted at various angles to increase the surface area of the tongue 1130, which may be subjected to stresses induced by the toroidal vortices.

In some embodiments, Electrical Discharge Machining (EDM) may be used to introduce the slits 1131 and 1132. EDM may offer a more accurate and localized technique for introducing the slits 1131 and 1132 than various other techniques. In one embodiment, EDM may be used to form the slits 1131 and 1132 in the same set up as the sensor cavity 1120 described above.

For piezoelectric sensors, where the tong stiffness may be required, fewer slits than the total number of radial slits 1135 and circumferential slits 1131 and 1132 may be required. In this case, only the radial slits 1135 may be needed, while the circumferential slits 1131 and 1132 may be eliminated. Such a depiction is shown as slits 1135a, which may be used to form the tongue 1130a with no narrow portion like 1124.

As described above, a tongue with slits used in conjunction with differential sensing may be used to eliminate common mode noise. To eliminate extrinsic differential mode parasitic noise exciting the tongue in the same or a similar way as alternating toroidal vortices, an additional sensor body (e.g., the sensor body 328 or 344 in FIG. 3B) may be included on the same or in another support (e.g., the support 316 in FIG. 3B) in which a sensor body does not previously exist, for detecting the extrinsic parasitic noise. Such a sensor body 328 or 344 may include one or more transducers for detecting the parasitic noise.

In one embodiment, differential mode extrinsic parasitic noise may be canceled using two inserted sensor bodies or probes (e.g., a sensor body 328 in FIG. 3B, or a sensor body 344 in FIG. 3B for embedded sensors) located in one or two different supports (e.g., the supports 316 in FIG. 3B). Each sensor body 328 or 344 may include one or more transducers such as, but not limited to, the transducers 428a and 428b in FIG. 4 (for an insertion sensor body) and transducers 844a and 844b in FIG. 8 (for embedded transducers). In one example, one sensor body 328 inserted into a first support 316 may be relatively more sensitive to the extrinsic parasitic noise than the other sensor body 328 inserted into a second support 316, which may be relatively more sensitive to toroidal vortices generated by the VRG 304 in FIG. 3B. Using a processor, the extrinsic parasitic noise may be canceled by subtracting the signals from one or more of the respective sensor bodies such as, but not limited to, the sensor bodies 328 or 344 in FIG. 3B), in one embodiment. Numerous other examples of cancelling common mode noise and/or parasitic noise may exist.

Various other configurations will now be described in association with FIGS. 12A-E. FIGS. 12A-E illustrate configurations for sensing toroidal vortices using differential isolation diaphragms 1234a and 1234b (one may be closer to the outer side of the ring 1204a and the other may be closer to the inner side 1204b). As detailed in FIG. 12C, a diaphragm may refer to a wall 1234 of a dry cavity 1220 in the vortex ring generator having two downstream blind cutouts 1234a and 1234b. In one embodiment, the diaphragms 1234a and 1234b may rest on shoulders 1234c and 1234d and may use weldments 1248a and 1248b. In another embodiment, FIG. 12D, the diaphragms 1234a and 1234b may be machined or cast as blind recesses without the need for shoulders or weldments. Various other configurations of a diaphragm as referred to herein may exist in other embodiments.

The flat surfaces 1234a and 1234b may be across from a dry cavity 1220, in one embodiment. In another embodiment, such as that shown in FIG. 12C, the flat cutouts 1234 may have penetrations into the cavity 1220 and may require weldments 1248.

Figure 12D:
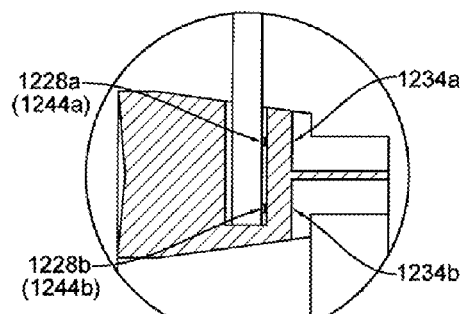
FIGS. 12C and 12D illustrate a detailed cross-sectional view of the vortex ring generator of FIG. 12A, according to certain embodiments of the disclosure.
Figures 12A, 12B:
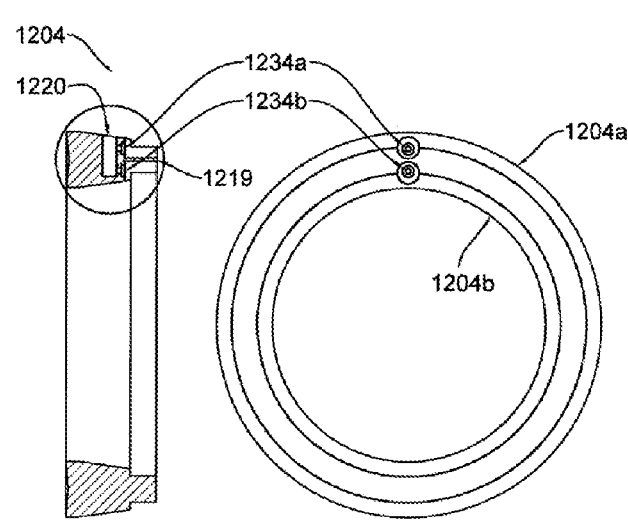
FIG. 12A illustrates a front view of a vortex ring generator illustrating an alternative sensing arrangement, according to an embodiment of the disclosure.
FIG. 12B illustrates a cross-sectional view of the vortex ring generator of FIG. 12A, according to an embodiment of the disclosure.
Figure 12C:
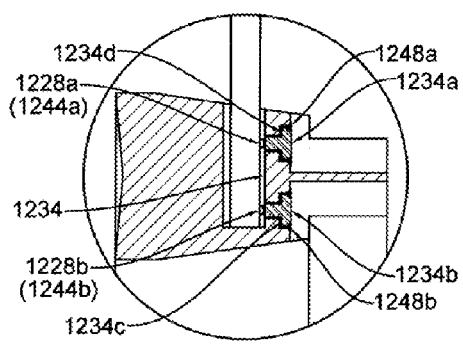
Figure 12E:
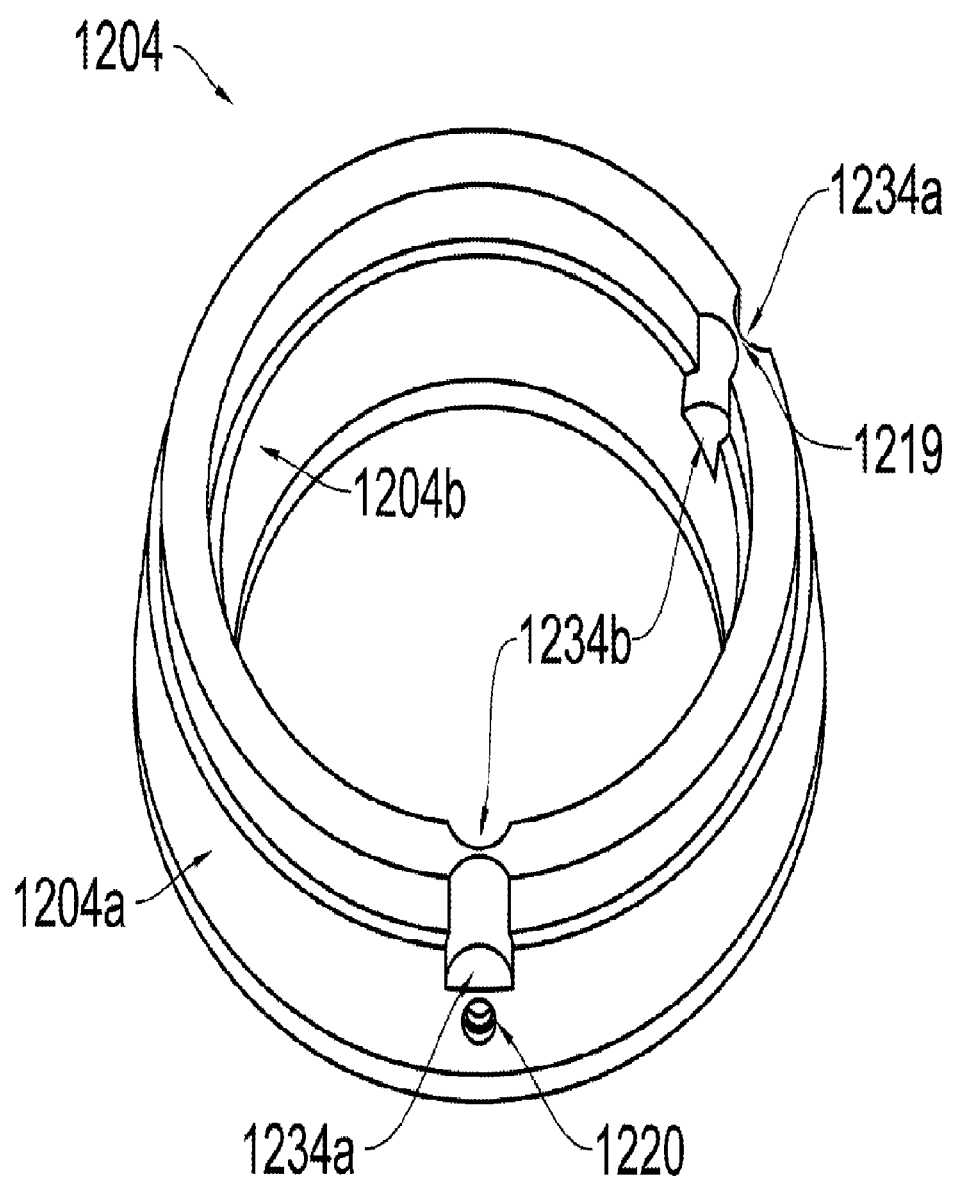
FIG. 12E illustrates a three-dimensional representation of the vortex ring generator of FIG. 12A, according to an embodiment of the disclosure.

The above described elements of a diaphragm are illustrated in a three-dimensional view in FIG. 12E. According to this configuration, the diaphragms may be formed by milling or casing flat surfaces 1234a and 1234b on the downstream of the VRG 1204. The cutouts 1234a and 1234b may be across from the dry cavity 1220. FIG. 12E illustrates the possible use of dual vortex sensor by having the cutout recesses 1234a and 1234b at more than one location on the VRG 1204. Various other configurations may exist in other embodiments.

As shown in FIG. 12A, no slits such as, but not limited to, the slits 331, 332, and 335 used to form the tongue 330 in FIG. 3B may exist in the VRG 1204, in some configurations. As will be described below, the diaphragms 1234a and 1234b may sense toroidal vortices instead of a tongue. Further, as shown in FIGS. 12B and 12E, the diaphragms 1234a and 1234b may be isolated at least in the way that a rigid portion, such as the portion 1219 in FIG. 12B, may separate the two diaphragms 1217 and 1218.

FIG. 12C also illustrates certain aspects of the diaphragms 1234a and 1234b. Shown in FIG. 12C are the shoulders 1234c and 1234d and the welds 1248a and 1248b of the diaphragms 1234a and 1234b. The design of the diaphragms 1234a and 1234b may enable a redundant pressure containment protection. For example, if the welds 1248a and/or 1248b separate, break, or otherwise fail, the shoulders 1234d and 1234c may seal the respective cavity of the diaphragms 1234a and 1234b, respectively. In one embodiment, the shoulders 1234c and 1234d may be conical and may be coated for sealing. The shoulders 1234d and 1234c may also provide protection against over pressuring the diaphragms 1234a and 1234b, respectively. In another embodiment, such as that shown in FIG. 12D, the isolation diaphragms 1234a and 1234b may include blind holes instead of the welds 1248a and 1248b.

The isolation diaphragms 1234a and 1234b may be alternately stressed by the toroidal vortices alternately shedding off the outer side 1204a and the inner side 1204b of VRG 1204. This stress may be sensed by the differential strain insertion transducers 1228a and 1228b (or 1244a and 1244b for embedded transducers) shown in FIGS. 12C and 12D. The strain transducers may be insertion 1228a and 1228b or embedded 1244a and 1244b type transducers as described herein. The strain transducers may be located in a dry cavity 1220 that may be across from the recessed cutouts 1234a and 1234b, in one embodiment. According to this embodiment, the strain transducers may detect the toroidal vortices using similar techniques as those explained in association with FIGS. 4, 6, 8, 9, and 10.

In one embodiment, differential pressure may be taken across two points 1234a and 1234b on the trailing side of the VRG 1204 where the vortex effect may be relatively strong. The diaphragms 1234a and 1234b may both face downstream, in one embodiment. The diaphragm 1234a may be independently stressed by the outer toroidal vortex while the diaphragm 1234b may be independently stressed by the inner toroidal vortex. The differential transducers 1228a and 1228b (or 1244a and 1244b), respectively, may sense such stresses. According to this configuration, a differential sensor may detect a differential strain based at least in part on a first strain transducer located at, near, proximate to, or otherwise associated with, the first diaphragm and a second strain transducer located at, near, proximate to, or otherwise associated with, the second diaphragm.

Such an arrangement may enable the cancellation of both the extrinsic parasitic common and the differential mode noises because the common mode noise and the differential mode noise may be unable to cause the VRG to oscillate in torsional modes. It may only be the toroidal vortices that may excite the diaphragms 1234a and 1234b in a differential fashion. Unlike the case of using tongues (FIG. 3) to detect the passage of the toroidal vortices, the use of diaphragms 1234a and 1234b may eliminate the need for other diaphragms to isolate the extrinsic differential mode noise.

The insertion sensor 1228 may be replaced without the need to depressurize the line and without the need to calibrate (or recalibrate) the flow meter, in certain embodiments herein.

Figures 13A, 13B:
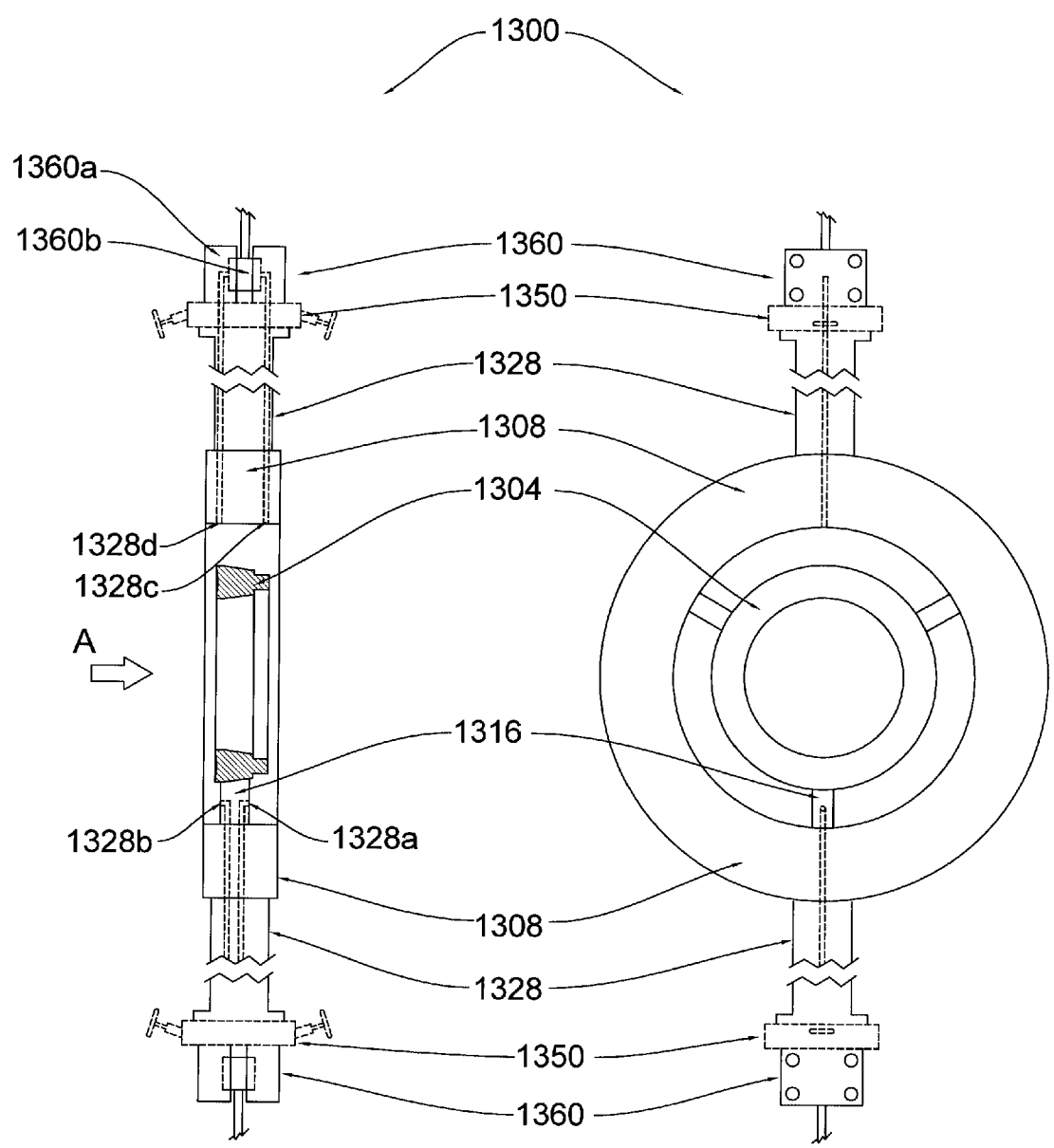
FIG. 13A illustrates a front view of a flowmeter illustrating a differential pressure transducer arrangement, according to an embodiment of the disclosure.
FIG. 13B illustrates a cross-sectional view of the flowmeter of FIG. 13A, according to an embodiment of the disclosure.

FIGS. 13A and 13B illustrate a vortex flowmeter 1300 configured to detect differential pressure, according to an embodiment of the disclosure. Such detection may be used in conjunction with a toroidal vortex sensing technique. The vortex sensing technique may be based at least in part on the difference in pressure induced by the generated toroidal vortices between two locations, which may be near the VRG 1304. For example, a difference in pressure may be based at least in part on a first location just upstream of the VRG 1304 and a second location just downstream of the VRG 1304. Numerous other locations may be used in determining the difference in pressure in other examples. In some embodiments, such as in FIG. 13A, the vortex sensing technique may not require that slits be present on the VRG 1304.

FIG. 13B illustrates various configurations for detecting the differential pressure between locations at or proximate to the VRG 1304, according to an embodiment of the disclosure. In one embodiment, a first pressure may be detected at a location just upstream of the VRG 1304 and a second pressure may be detected at a location just downstream of the VRG 1304. In one aspect of the embodiment, the toroidal vortex effect may be strong on the downstream side of the VRG 1304 and may be diminishing on the upstream side of the VRG 1304.

A first configuration for detecting the differential pressure may include holes or ports 1328c and 1328d that may each include a respective transducer that may communicate the differential pressure through impulse lines that may go through the conduit body 1308, a connector 1328, and a manifold 1350 to a quick response differential pressure sensor 1360 that may detect a differential pressure. Thus, the openings of the ports 1328c and 1328d may be located in the body or conduit 1308 portion of the flowmeter 1300. In one configuration, the port 1328d may be located upstream of the VRG 1304 at a point where a toroidal vortex may not be viewed or sensed by a transducer associated with the port 1328d, while the port 1328c may be located downstream of the VRG 1304 at a point where the toroidal vortex may be viewed or sensed by a transducer associated with the port 1328c. A pressure differential between the transducer connected to (or otherwise associated with) the port 1328c and the transducer connected to (or otherwise associated with) the port 1328d may be representative of the passage of a toroidal vortex, according to this configuration.

A second configuration for detecting the differential pressure may include holes or ports 1328a and 1328b that may each include a respective transducer. The ports 1328a and 1328b may be introduced through the support 1316 and may pass through the conduit portion of the meter body 1308, a connector 1328, and a manifold 1350 to a differential pressure sensor 1360, as shown. In one configuration, the port 1328b may be located upstream of the VRG 1304 at a point where a toroidal vortex may not be viewed or sensed by a transducer associated with the port 1328*b*, while the port 1328*a* may be located downstream of the VRG 1304 at a point where the toroidal vortex may be viewed or sensed by a transducer associated with the port 1328*a*. A pressure differential between the transducer associated with the port 1316*a* and the transducer associated with the port 1316*b* may be representative of the passage of a toroidal vortex, according to this configuration.

In another embodiment, the ports 1328*a* and 1328*b* may be on the toroidal vortex generator 1304 in a similar arrangement as that shown in FIG. 12. In such a case the ports 1328*a* and 1328*b* may be facing downstream with port 1328*a* closer to the outer side of the ring 1304 and the port 1328*b* closer to the inner side of the ring 1304. In this embodiment, the differential pressure between the diaphragms 1328*a* and 1328*b* may be communicated to the sensor 1360 through impulse lines that may travel from the VRG 1304 through the support 1316, the body 1308, the connector 1328 and the manifold 1350.

In certain embodiments herein, a quick response sensor 1360 may detect the pressure differential to determine the frequency (and the amplitude) of the toroidal vortex shedding. In one embodiment, a quick response sensor 1360 may be used to detect the differential pressure between the upstream and the downstream of the VRG 1304. A differential pressure transmitter or various other sensors or devices may be used to detect the differential pressure in other embodiments.

The ports 1328*a*, 1328*b*, 1328*c*, and 1328*d* described above may be arranged in various positions with respect to fluid flowing through the vortex ring flowmeter 1300. In one configuration, such ports may be positioned orthogonally to the fluid flow. For example, the ports 1328*c* and 1328*d* located in the body of the vortex ring flowmeter 1300 may receive transducers that are positioned to sense orthogonally to the flow of the fluid. In another configuration, the ports may be positioned axially parallel to the fluid flow. For example, the ports 1328*a* and 1328*b*, which may be located in the support 1316 or on the back of the ring 1304, may receive transducers that are positioned to sense parallel to the fluid flow. Various other angular positions of the ports may exist in other embodiments.

In certain embodiments, the differential pressure sensor body 1360 may include a flange 1360*a* and a capsule 1360*b*. The capsule 1360*b* may have one or two diaphragms (not shown). The pressure applied through or otherwise influencing the environment immediately surrounding the ports 1328*c* and/or 1328*a* may affect one diaphragm, and the pressure applied through or otherwise influencing the environment immediately surrounding the ports 1328*d* and/or 1328*b* may affect the other diaphragm, in one configuration. In some embodiments, the capsule 1360*b* may include two convoluted surfaces (not shown) that may be separated from the diaphragms by a small gap to prevent damages that may arise from overpressure. In some embodiments, such as in applications for which a fast response time may be desired, the capsule 1324*b* may not be oil-filled.

Monitoring the deflections of the diaphragm(s) of the capsule 1360*b* may be done using the insertion strain sensor bodies such as, but not limited to, the insertion sensor body 428 illustrated in FIG. 4, or the embedded strain sensors 844*a* and 844*b* illustrated in FIG. 8.

A manifold valve associated with the manifold 1350 may facilitate replacing sensor bodies 1360 associated with measuring the differential pressure without shutting down or depressurizing the line. There may be no need to recalibrate the flowmeter 1300 after replacing the sensor body 1360 since the VRG 1304 is unchanged.

By using a differential pressure (DP) cell, as demonstrated in FIGS. 13A and 13B, both the extrinsic common and differential noise may be eliminated. It may only be the toroidal vortices that may excite the ports 1328*a* and 1328*b* (or 1328*c* and 1328*d*) in a differential fashion. Unlike the case of using tongues (FIG. 3) to detect the passage of the toroidal vortices, the use of ports 1328*a* and 1328*b* (or 1328*c* and 1328*d*) may eliminate the need for other ports to isolate the extrinsic differential mode noise.

When the toroidal vortex shedding is not stable at lower Reynolds numbers, the differential pressure between 1328*a* and 1328*b* (which may be relatively small in some examples) may be used as a flow indicator (not for flow metering), in some embodiments. This ability to detect a very low flow may be advantageous since a vortex flowmeter may indicate zero flow below the minimum Reynolds number. In one embodiment, measuring a differential pressure across an upstream and a downstream location of the VRG 1304 may include detecting flows below the minimum Reynolds number for regular, alternating vortex formation. Such differential pressure may indicate the presence of flow.

In some configurations, the connector 1328 may be substantially reduced in length for a flanged conduit body such that they may not require clearance of a bolt circle on the line flanges. Certain embodiments illustrating a conduit portion of a meter body with flanges attached thereto are provided in further detail below with reference to FIG. 14.

Figure 14:
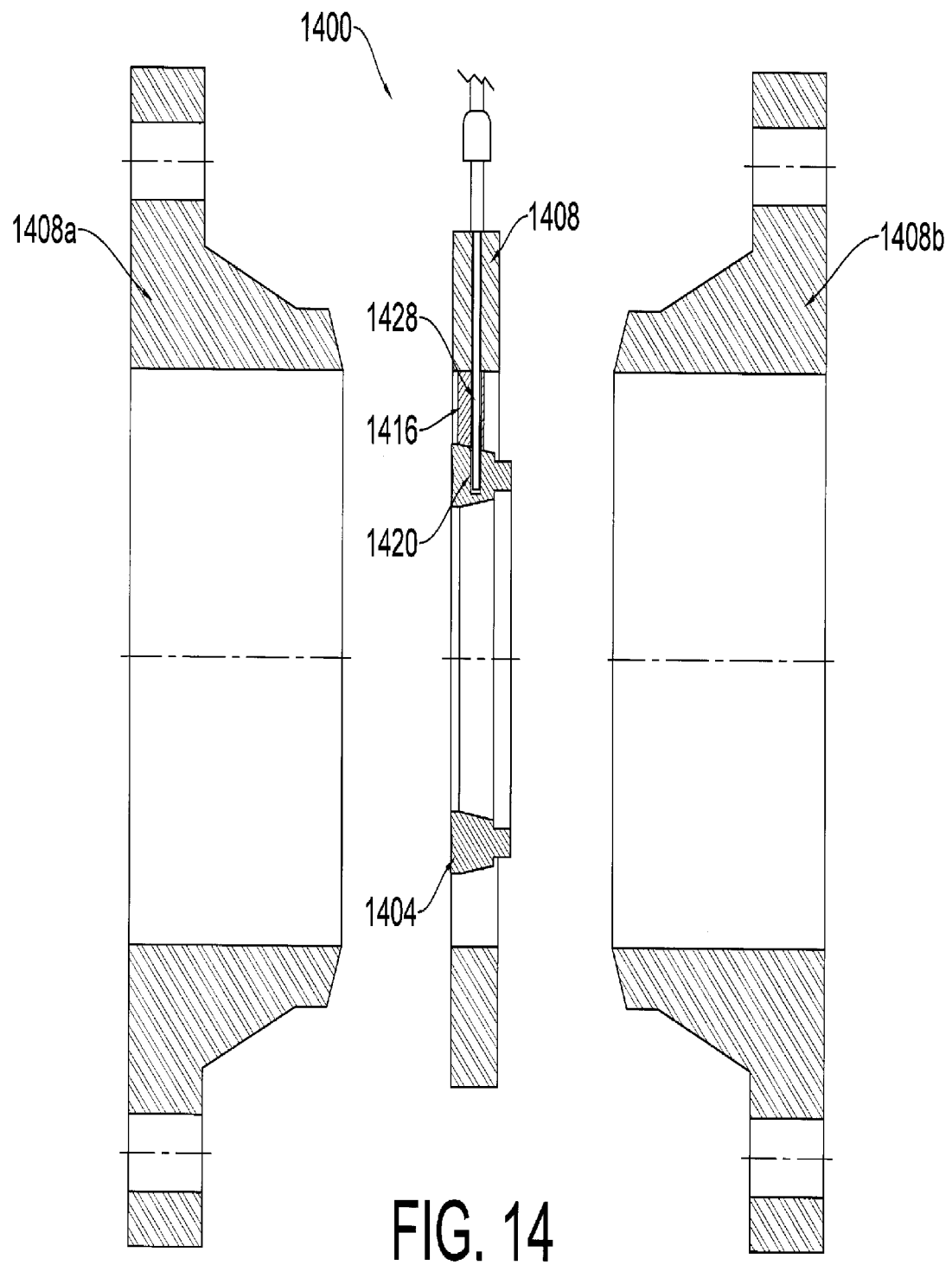
FIG. 14 illustrates a cross-sectional view of a flowmeter and flanges that can be attached thereto, according to an embodiment of the disclosure.

FIG. 14 illustrates a cross-section of a vortex flowmeter 1400 and flanges 1408*a* and 1408*b* that may be attached thereto, according to an embodiment of the disclosure. The flowmeter 1400 may be produced by fabrication, welding, machining, 3D printing and/or cast components (for example, using Replicast/investment lost wax near net casting methods or other techniques). The components may include the conduit body plate 1408 of the vortex ring generator (VRG) 1404 and the supports 1416, which may be heavy duty and/or streamlined in various embodiments. In some embodiments, the flowmeter 1400 may be produced by casting a single piece that provides the aforementioned components as an integral unit. The flowmeter 1400 may be constructed from one or more types of metals, plastics, or other suitable materials.

According to some embodiments, the VRG 1404 may be equipped with slits and tongues, such as those shown in FIG. 3B; the VRG 1404 may be equipped with isolation diaphragms, such as those shown in FIG. 12; or the VRG 1404 may be equipped with differential pressure impulse lines, such as those shown in FIG. 13.

In some embodiments, the flowmeter 1400 may be relatively thin such that it may be inserted between existing line flanges replacing thin orifice plates. In other embodiments, the flowmeter 1400 may be made relatively thick to replace wafer bodies. The conduit body plate 1408 may accept flanges 1408*a* and 1408*b* with pressure ratings to match the application. Such flanges 1408*a* and 1408*b* may be welded to the conduit body plate 1408 in some embodiments. In another embodiment, the flanges 1408*a* and 1408*b* may be cast integral to the body 1408.

Figure 15:
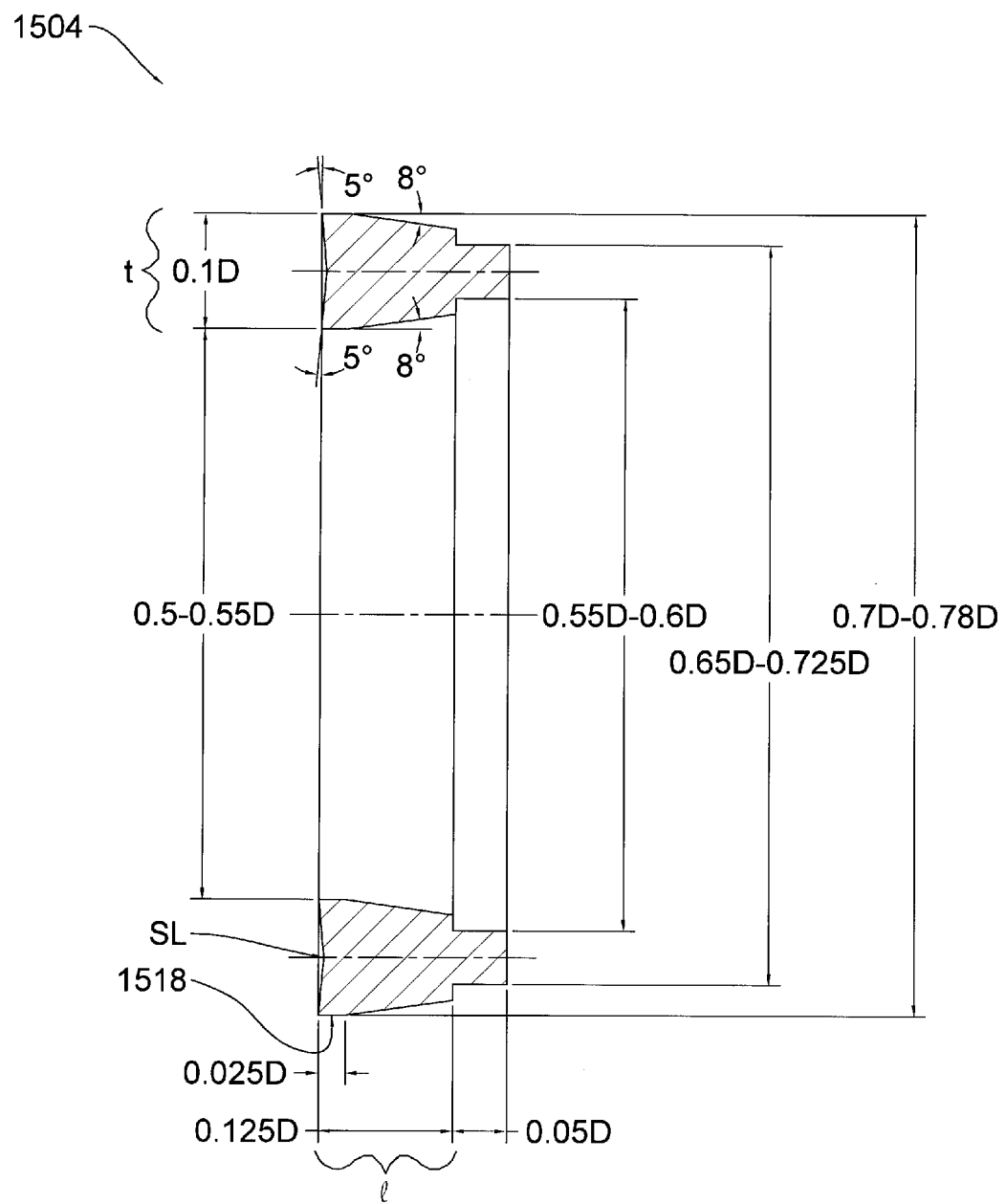
FIG. 15 illustrates a cross-sectional view of a vortex ring generator illustrating certain aspects of an optimized vortex ring generator geometry, according to an embodiment of the disclosure.

FIG. 15 illustrates a cross-section of a vortex ring generator (VRG) 1504, according to an embodiment of the disclosure. In this illustration, the dimensions may be non-dimensional in which D is the diameter of the conduit portion of the meter body. Two dimensions in accordance with certain embodiments are the frontal thickness of the VRG 1504, which may be t/D=0.1, and the depth of the VRG 1504, which may be l/D=0.125. Such dimensions may have a high influence on the toroidal vortex shedding frequency and the K-factor, in some embodiments. Certain conventional shedder bars may have t/D and l/D dimensions ranging from 0.2 to 0.33 (i.e. t/D and l/D for VRG 1504 may be one-half to one-third the size of conventional shedder bars), and therefore embodiments providing the VRG 1504 with an optimized geometry may allow for slimmer flowmeter bodies.

A slim t/D and a short l/D may result in a high toroidal vortex shedding frequency which in turn may allow for a better resolution and larger flowmeter sizes. The conduit bore diameter D may reach 24" (inches) in size. A short l/D may also allow designing a thin plate flowmeter body, such as the flowmeter body 308 in FIG. 3B, that may match the orifice plate carrier plate thickness allowing a drop-in replacement of the orifice plates.

Other features may include the beveled frontal circular face to trap the stagnation line circle SL. The flat section 1518 may help maintain the frontal edges relatively sharp. The shape and extent of the back downstream section of the vortex ring generator 1504 may affect the alternation of the toroidal vortices in the manner explained in the discussion of FIG. 2. These features (e.g., the beveled frontal face, the short flats 1518, and the shape of the back of the VRG 1504) may have a significant effect on the linearity of a flowmeter.

The sensor bodies that include one or more transducer types or configurations disclosed herein may not be limited to stress/strain transducers, fiber optic transducers, piezoelectric transducers, differential pressure transducers, insertion sensor probes (for example, a sensor body or probe that includes one or more transducers capable of being inserted into and removed from a cavity such as the cavity, such as the cavity 320 in FIG. 3B), embedded transducers, or a combination thereof. Other transducer types may include micro-bending transducers, speckle pattern transducers, capacitive transducers, resistive transducers, ultrasonic transducers, thermal transducers, capacitive switches, etc. As described above, some types of transducers may not be coupled to or otherwise associated with a sensor body but may be inserted into or embedded within a cavity, for example, independent of a sensor body or probe.

Sensing techniques such as sensing the toroidal vortex shedding frequency using velocity victor (for example, ultrasonic), thermal sensors, etc., may exist in other examples.

The sensor bodies described herein including, but not limited to, multi-variable sensor configurations, may have their signals processed by one or more processors in communication with amplifier circuitry (not shown), in various embodiments herein. Example multivariable sensors may include temperature and pressure sensors. The density of the fluid flow may be inferred from the fluid temperature and/or pressure measurements.

In one embodiment, a differential signal may be a series of pulses whose frequency may be proportional to the fluid velocity. Each pulse may represent passage of a specific volume. The amplitude of the pulses may be proportional to the volume flow rate squared times the fluid density. Accordingly, from the frequency (the volume flow rate) and the amplitude of the pulses, the density may be deduced. Since the vortex ring generator (VRG) may generate more coherent toroidal vortices with a better signal-to-noise ratio than traditional shedder bars, the pulse amplitude and accordingly the density may be more reliably measured as compared to conventional techniques.

Figure 16:
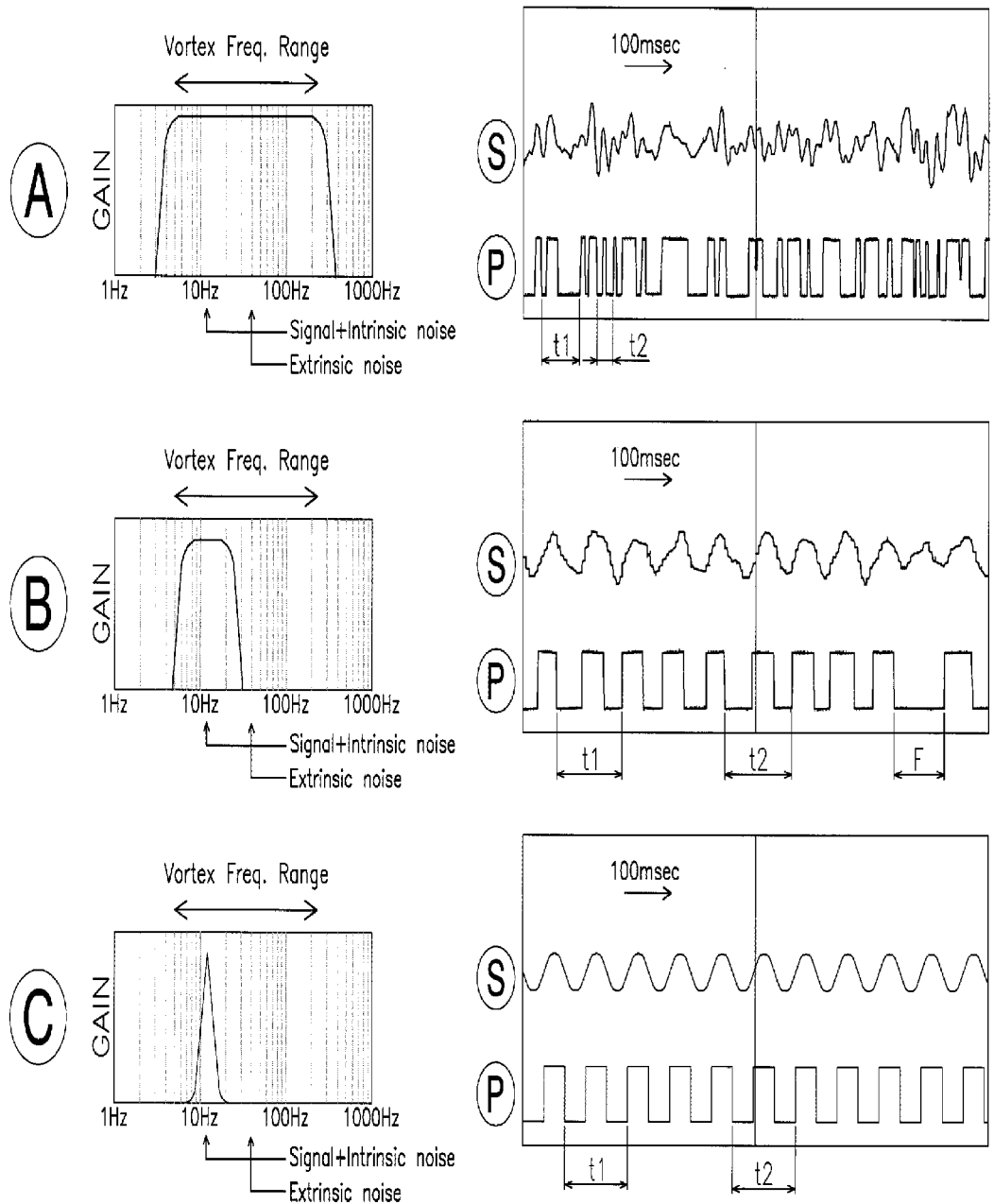
FIG. 16 illustrates the effect of the frequency lock-in technique in eliminating both the extrinsic parasitic line noise and the vortex signal intrinsic noise, according to an embodiment of the disclosure.

FIG. 16 illustrates the effect of the frequency lock-in technique in eliminating both the extrinsic parasitic line noise and the vortex signal intrinsic noise, according to an embodiment of the disclosure. The frequency of vortex shedding may be identified and stored such that the operation of the associated vortex flowmeter may be locked-in or set to the identified frequency. In so doing, the vortex flowmeter may use spectrum analysis to filter out various types noise including, but not limited to: (a) extrinsic parasitic noise (both in common and differential modes) and (b) intrinsic instabilities, such as signal frequency jitter and signal amplitude fading, each of which may cause the vortex shedding pulses to vary. The toroidal vortex frequency range of a particular flowmeter size may be divided into two ranges (e.g., one low frequency range for liquid applications, and another higher frequency range for gas application), in one embodiment.

The top portion A of FIG. 16 may show the application of a band-pass filter that may cover the vortex frequency range for one of the applications mentioned above. The wide range band-pass filter, in this case, may not filter out the extrinsic parasitic noise. The top portion A of FIG. 16 shows a signal trace S that may be a combination of the toroidal vortex signal with superimposed extrinsic and intrinsic noise. As a result, the square wave pulse P may show variation in the pulse width represented by unequal $t_1$ and $t_2$.

Shown in the middle portion B of FIG. 16 is a dynamic/moving band-pass filter that may be set around the identified frequency of toroidal vortex signal. The narrower dynamic band-pass filter may filter out the extrinsic noise. The middle portion B of FIG. 16 may result in a cleaner signal trace S and pulse P. There may still be a difference (jitter) between $t_1$ and $t_2$, and there may be occasional fade F. The intrinsic jitter and fade F may be due to phase shift and/or amplitude shift between the differential signals from insertion transducers such as, but not limited to the insertion transducers 428a and 428b in FIG. 4, or the embedded transducers 844a and 844b in FIG. 8.

The bottom portion C of FIG. 16 illustrates the use of a dynamic/moving frequency lock-in to the toroidal vortex frequency, according to one embodiment. Portion C may more effectively filter out the extrinsic noise. The bottom portion C of FIG. 16 may result in a sinusoidal signal S and a pulse train P free (or at least substantially free) of jitter (where $t_1$ equals or approximately equals $t_2$), and free of fading (e.g., no missing pulses). In this embodiment, both extrinsic line noise and intrinsic toroidal vortex noise may be eliminated, and hence, the vortex flowmeter may operate at an optimal vortex shedding frequency that may not react to transient effects of jitter, fading, etc.

In various embodiments, the spectrum analysis, Fast Fourier Transform, or other techniques may be used to identify the frequencies of the vortex shedding and the different extrinsic parasitic line noise. To isolate the vortex signal frequency, a characteristic vortex ring generator (VRG) curve may be required. The curve may represent the relation between the vortex shedding strength (amplitude) and the frequency. The relation between the amplitude and the frequency may depend on the flowmeter and the VRG size. It may be a simple fitted curve of empirical data of the vortex shedding amplitude vs. frequency. The identified toroidal vortex signal may be within a known frequency range and within a known amplitude range.

In certain embodiments herein, intrinsic vortex signal noise (e.g., jitter and fade) may be canceled. In one embodiment, one or more processors may perform the cancellation. Cancellation of intrinsic vortex signal noise may include determining the characteristic relationship between the vortex shedding frequency and the vortex shedding amplitude associated with at least one sensor body, such as the sensor body 428 in FIG. 4 or embedded transducers 844*a* and 844*b* in FIG. 8. Such a relationship may be predetermined, in one embodiment. The cancellation of intrinsic vortex signal noise may also include determining the spectrum of output of a differential signal, which may be determined by subtracting a first signal detected by a first transducer from a second signal detected by a second transducer.

The cancellation of the intrinsic vortex signal noise may further include isolating the vortex shedding frequency with the intrinsic instability and the extrinsic vibration noises. The cancellation may further include identifying the vortex shedding frequency from the spectrum using the predetermined characteristic relationship between the shedding frequency and the vortex shedding amplitude, in one embodiment. Isolating and identifying the vortex shedding frequency may generate a stable amplitude and a pulse train free from intrinsic jitter and fade. The cancellation may further include generating a scaled pulse train proportional to the identified vortex shedding frequency.

In some embodiments, a density of fluid flow may be calculated. The calculation may be performed by one or more processors in at least some of these embodiments. The calculation may include determining a vortex shedding frequency. The calculation may also include measuring the amplitude of the vortex shedding, which may be based at least in part on the spectrum of output of a differential signal, as described above. The amplitude of the vortex shedding may be proportional to the density times the fluid flow squared. The density may be determined by dividing the amplitude of the vortex shedding by the vortex shedding frequency squared. In one embodiment, multivariable sensor outputs of temperature and pressure may be used to determine the density of the fluid flow as a function of the temperature and the pressure.

In one embodiment, the identified or locked-in signal frequency may be used by the vortex flowmeter processor to generate a certain number of pulses consistent with such frequency. In this way, operation of the vortex flowmeter may not be susceptible to noise as the vortex flowmeter continues to operate over time. In various configurations, an amplifier, one or more processors, and/or various other devices or components of the vortex flowmeter may be used to implement such identification of the vortex shedding frequency and generation of stable pulses, as well as monitoring and updating the stored frequency. For example, as the flow rate of fluid traveling through the vortex flowmeter changes, the vortex flowmeter may detect the change and identify a new frequency of vortex shedding that also may not include the extrinsic and intrinsic noises described above, and may store or lock-in such a frequency for operating the vortex flowmeter. Locking in to a particular frequency free (or at least substantially free) of jitter and fade may allow a vortex flowmeter to handle small batch custody transfer applications.

Figure 17A:
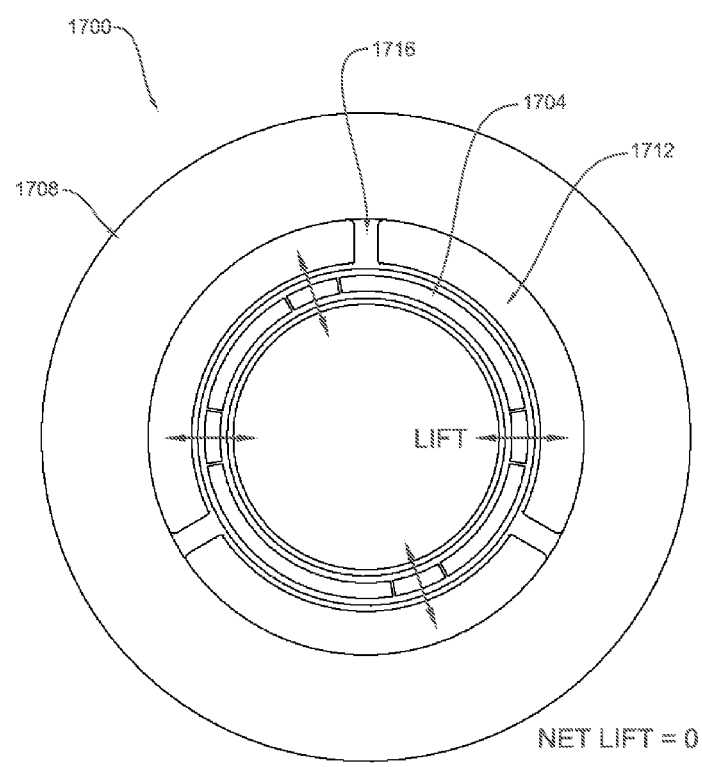
FIG. 17A illustrates a front view of a flowmeter, according to an embodiment of the disclosure.
Figure 17B:
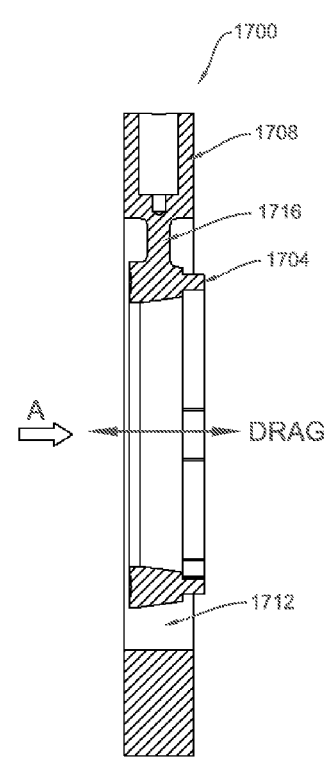
FIG. 17B illustrates a cross-sectional view of the flowmeter of FIG. 17A, according to an embodiment of the disclosure.

FIGS. 17A and 17B illustrate front and cross-sectional views of a flowmeter 1700, according to an example embodiment of the disclosure. Referring now to FIGS. 17A and 17B, the flowmeter 1700 can include a vortex ring generator (VRG) body 1704. The body 1704 may be a bluff body configured to generate, induce, shed, or otherwise produce toroidal vortices when the body 1704 is disposed within a flow of one or more fluids. Such fluids may include one or a mixture of multiple types of fluids, such as one or more liquids, gases, steam, etc.

The flowmeter 1700 may further include a thin, plate-like conduit body 1708 having a bore 1712 through which fluid may flow. Arrow A indicates the direction of fluid flow relative to flowmeter 1700. The body 1704 may be centered, approximately centered, or otherwise located within the bore 1712. In certain example embodiments, the body 1704 may be substantially ring-shaped or annular. That is, the body 1704 may be constructed or otherwise formed to resemble an axisymmetric ring that is substantially symmetrical about an axis of the body 1704. Such an axis may be shared with the conduit body 1708 or a conduit portion of the conduit body 1708 for receiving a fluid in the direction indicated by the arrow A.

The body 1704 may also include a relatively thin frontal and depth thicknesses as compared to that of conventional bluff bodies. Such a relatively thin frontal thickness of the body 1704 may enable a relatively thin conduit body 1708, which may have the same or approximately the same thickness as a depth of the support structures or supports 1716. In one example embodiment, such frontal and depth thicknesses may be one-tenth of the diameter of the bore 1712. In certain example embodiments, the thickness of the conduit body 1708 may be increased to match a wafer body standard. In at least these ways, a vortex ring generator (e.g., the body 1704) may be optimized to generate coherent toroidal vortices with a relatively higher signal-to-noise ratio as compared to that for conventional techniques, and hence, may enable more reliable measurements of the frequency and/or the amplitude of the vortex shedding or the velocity and/or the density of a fluid flow.

The example flowmeter 1700 may also include one or more legs or supports 1716 that may secure the body 1704 to the conduit body 1708. In certain example embodiments, each of the supports 1716 may be streamlined, thereby minimizing interference with the toroidal vortices. Leading and trailing edges of the supports 1716, among other features, may facilitate such a streamlined configuration. The supports 1716 may be streamlined in the way that they may be planar or substantially planar members and may have a first end coupled to an annular outer surface of the body 1704 and an opposing, distal second end coupled to an inner annular surface of the conduit body 1708. Further, the leading edge of each support 1716 may be curved and generally thinner than the trailing edge of each support 1716.

In certain example embodiments, the supports 1716 may be attached to the body 1704 on the upstream and/or downstream sides of the ring body 1704, where the upstream side may be the side of the body 1704 before fluid traveling in the direction indicated by the arrow A contacts the body 1704, and the downstream side may be the side of the body 1704 where the fluid travels past the body 1704 after contacting the body 1704.

Although the example flowmeter 1700 of FIGS. 17A and 17B shows three supports 1716, fewer or more supports 1716 may exist in other configurations. For example, four supports 1716 may be used to secure the body 1704 to the conduit body 1708 in one alternative example. In some configurations, the number of supports 1716 may vary to accommodate the number of sensor bodies desired and/or a desired rigidity of the assembly.

In certain example embodiments, when the body 1704 is placed in a steady fluid flow (as indicated by arrow A) within the conduit body 1708 of the flowmeter 1700, the body 1704 may experience a static force on it. FIG. 17A depicts a lift force, which is the force component perpendicular to the approaching flow direction A. FIG. 17B depicts a drag force, which is the force component in the direction of the approaching flow A. Further, if the body 1704 is a bluff body generating vortices (like the ring-shaped bluff bodies discussed herein), the body 1704 may experience an additional vortex induced pulsating dynamic force on it, with a pulsating lift component perpendicular to the flow direction A and a pulsating drag component in the direction of the flow A.

Sensing the vortex shedding with a tongue, as discussed above with reference to FIG. 1, may utilize the pulsating lift component to detect the vortex shedding. Sensing the vortex shedding with diaphragms on the tail end of the outer and inner sides of the vortex ring generator, as discussed above with reference to FIG. 12, may utilize the pulsating drag component to detect the vortex shedding.

FIGS. 17A and 17B show the lift and the drag for a vortex ring generator body 1704. In certain example embodiments, the net integrated dynamic pulsating lift effect and the net integrated static lift effect on the entire vortex ring generator body 1704 may be zero. This is why a localized tongue may be used to detect the dynamic pulsating lift on the body 104, as discussed above with reference to FIG. 1. However, in other example embodiments, the net integrated dynamic pulsating drag effect and the integrated static drag effect may not be zero. In these situations, the integrated dynamic pulsating drag effect and the integrated static drag effect may be measured.

While the drag coefficient may be less than the lift coefficient, the drag may offer some advantages in sensing the vortices. The vortex frequency of the pulsating lift on a tongue, as depicted in FIG. 1 and FIG. 17A, may only be complete when the two oppositely rotating toroidal vortices are shed off the inner and outer sides of the body 1704. In contrast, the dynamic drag cycle may be complete as each vortex is shed, resulting in doubling the frequency output. In this manner, the static drag on the body 1704 may be measured while the static lift on the body 1704 may be zero.

The vortex ring generator body 1704 depicted in FIG. 17B may be subjected to a static drag (similar to what is known as the Target flowmeter) and may be subject to a pulsating dynamic drag due to the vortex shedding. Independently, the static drag may be used to measure the fluid flow. The amplitude of the static drag force may be proportional to the squared flow velocity and the fluid density. On the other hand, independently, the vortex pulsating dynamic drag may be used to measure the fluid flow. The frequency of the pulsating dynamic drag may be proportional to the flow velocity. It may be noted that the vortex shedding frequency may be fluid density independent while the amplitude of both the static and the dynamic drag forces may be fluid density dependent.

Sensors measuring the static drag as well as the pulsating dynamic drag on a body 1704 may provide redundancy by checking the proper performance of each measurement. Such sensors also may extend the measuring range below the minimum Reynolds number for a stable vortex shedding. Below the minimum Reynolds number for a stable vortex shedding, the pulsating dynamic drag sensor fitted with a trigger level limit may indicate zero flow. At such a condition, the static drag amplitude sensor may give information about the flow.

In certain situations it may be easier to measure the larger average amplitude of the static drag than to measure the smaller and varying amplitude of the pulsating vortex induced drag. Measuring the amplitude of the average static drag may lead to calculating the fluid flow density since the static drag is proportional to the density times the squared velocity and since the velocity may be deduced from the frequency of the vortex dynamic drag. It is noted that measuring the varying amplitude of the pulsating lift may be as difficult as measuring the varying amplitude of the pulsating drag. It addition, the average static lift on the body 1704 generating vortices may be zero. Thus, the drag measurements may provide a practical way to measure the mass flow rate without the need to measure the temperature and/or the pressure of the fluid. Furthermore, calculating the density from temperature and pressure measurements may have errors if the composition of the fluid changes.

Figure 18C:
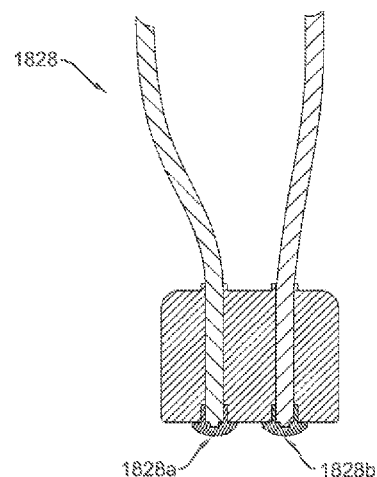
FIG. 18C illustrates a cross-sectional view of a drag sensor, according to an embodiment of the disclosure.
Figure 18A:
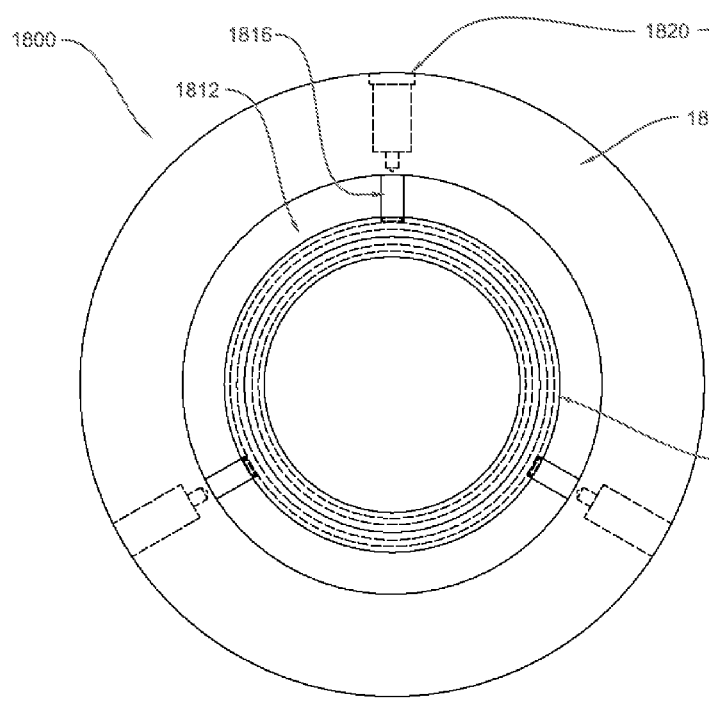
FIG. 18A illustrates a front view of a flowmeter, according to an embodiment of the disclosure.
Figure 18B:
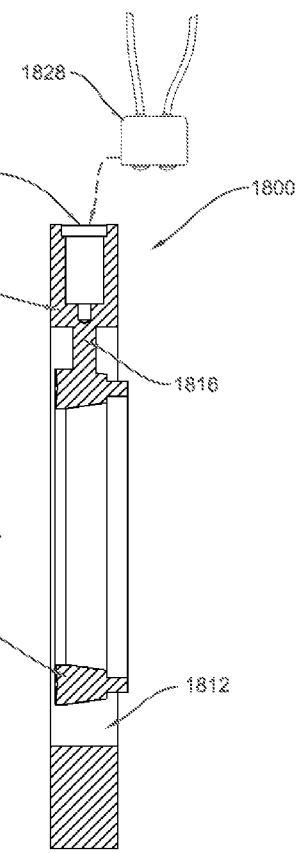
FIG. 18B illustrates a cross-sectional view of the flowmeter of FIG. 18A, according to an embodiment of the disclosure.

FIGS. 18A and 18B depict front and cross-sectional views of a flowmeter 1800, according to an embodiment of the disclosure. In one example, the flowmeter 1800 can be a drag vortex ring flowmeter 1800. Referring now to FIGS. 18A and 18B, the flowmeter 1800 can include a vortex ring generator (VRG) body 1804. The body 1804 may be a bluff body configured to generate, induce, shed, or otherwise produce toroidal vortices when the body 1804 is disposed within a flow of one or more fluids. Such fluids may include one or a mixture of multiple types of fluids, such as one or more liquids, gases, steam, etc.

The flowmeter 1800 may further include a thin, plate-like conduit body 1808 having a bore 1812 through which fluid may flow. Arrow A indicates the direction of fluid flow relative to flowmeter 1800. The body 1804 may be centered, approximately centered, or otherwise located within the bore 1812. In certain example embodiments, the body 1804 may be substantially ring-shaped or annular. That is, the body 1804 may be constructed or otherwise formed to resemble an axisymmetric ring that is substantially symmetrical about an axis of the body 1804. Such an axis may be shared with the conduit body 1808 or a conduit portion of the conduit body 1808 for receiving a fluid in the direction indicated by the arrow A.

The body 1804 may also include a relatively thin frontal and depth thicknesses as compared to that of conventional bluff bodies. Such a relatively thin frontal thickness of the body 1804 may enable a relatively thin conduit body 1808, which may have the same or approximately the same thickness as a depth of the support structures or supports 1816. In one example embodiment, such frontal and depth thicknesses may be one-tenth of the diameter of the bore 1812. In certain example embodiments, the thickness of the conduit body 1808 may be increased to match a wafer body standard. In at least these ways, the vortex ring generator (e.g., the body 1804) may be optimized to generate coherent toroidal vortices with a relatively higher signal-to-noise ratio as compared to that for conventional techniques, and hence, may enable more reliable measurements of the frequency and/or the amplitude of the vortex shedding or the velocity and/or the density of a fluid flow.

The example flowmeter 1800 may also include one or more legs or supports 1816 that may secure the body 1804 to the conduit body 1808. In certain example embodiments, each of the supports 1816 may be streamlined, thereby minimizing interference with the toroidal vortices. Leading and trailing edges of the supports 1816, among other features, may facilitate such a streamlined configuration. The supports 1816 may be streamlined in the way that they may be planar or substantially planar members and may have a first end coupled to an annular outer surface of the body 1804 and an opposing, distal second end coupled to an inner annular surface of the conduit body 1808. Further, the leading edge of each support 1816 may be curved and generally thinner than the trailing edge of each support 1816.

In certain example embodiments, the supports 1816 may be attached to the body 1804 on the upstream and/or downstream sides of the ring body 1804, where the upstream side may be the side of the body 1804 before fluid traveling in the direction indicated by the arrow A contacts the body 1804, and the downstream side may be the side of the body 1804 where the fluid travels past the body 1804 after contacting the body 1804.

The example flowmeter 1800 may further include one or more dry sensor cavities 1820 in the conduit body 1808 at or near the supports 1816 of the ring-shaped bluff body (i.e., vortex ring generator (VRG) body 1804). One or more transducers may be disposed within the dry cavities 1820. Each transducer may sense the mechanical effect component on each of the corresponding supports 1816 in the direction of the drag, while canceling the component in the direction of the lift. In this manner, the dry cavities 1820 may each accept, receive, house, etc. a drag sensor 1828 or the like, such as, for example, the one depicted in FIG. 18C. The drag sensor 1828 may be insertable into one of the dry cavities 1820 from outside the conduit body 1808. In addition, each of the drag sensors 1828 may be removed from the corresponding dry cavity 1820 and replaced without the need to depressurize or recalibrate the drag vortex ring flowmeter 1800. The drag vortex ring flowmeter 1800, including the body 1804, the supports 1816, and the conduit body 1808 may be cast, molded, or fabricated in one piece and may meet the 3-A Sanitary Standards.

In certain example embodiments, the mechanical effects induced by the toroidal vortices may be measured by a sensor within the dry cavity 1820. The sensor may include one or more transducers 1828a and 1828b. In some instances, as depicted in FIG. 18C, one or more transducers 1828a and 1828b of the sensor 1828 may measure the mechanical pulsating drag effect on the body 1804 at or near the supports 1816. The one or more transducers 1828a and 1828b may be associated with a sensor or probe 1828. In certain example embodiments, the transducers 1828a and 1828b may include fiber optic transducers. In other example embodiments, the transducers 1828a and 1828b may include Piezo elements or other transducer types capable of sensing the mechanical effect of the pulsating drag effect on the body 1804 near the supports 1816.

According to one example embodiment, the drag sensor 1828 may be disposed within the dry cavity 1820, with the first transducer 1828a placed on the upstream side of the conduit body 1808 within the dry cavity 1820 such that it may detect the extension strain resulting from the drag force pushing the body 1804 in the downstream direction. The second transducer 1828b may be disposed on the downstream side of the conduit body 1808 to detect the compression strain in the dry cavity 1820 as the pulsating drag force may stress the body 1804 in the downstream direction. Within the dry cavity 1820, the transducers 1828a and/or 1828b may detect the cyclic drag pulsations on the body 1804. In this or similar embodiments, common mode noise, such as that caused by line vibration in the plane of the body 1804, may be canceled by subtracting the signals from the two transducers 1828a and 1828b from each other. Although two transducers 1828a and 1828b are described in the example of FIG. 18C, fewer or more transducers in a variety of types and/or arrangements suitable for detecting one or more mechanical effects induced by pulsating drag due to the toroidal vortices generated by the body 1804 may exist in other configurations.

As described, the transducers 1828a and 1828b may be attached to, in connection with, or otherwise associated with the drag sensor 1828 or probe. The drag sensor 1828 may be inserted into the dry cavity 1820 formed within the conduit body 1808. In one example embodiment, the drag sensor 1828 may be at least partially disposed within the dry cavity 1820. The transducers 1828a and 1828b and/or at least a portion of the drag sensor 1828 itself may be firmly secured in the dry cavity 1820 and may be coupled to, attached to, or otherwise in contact with the dry cavity 1820.

The example embodiments described in FIGS. 18A and 18B may provide a number of advantages and/or technical solutions. For example, the drag sensors 1828 may enable doubling the shedding frequency, which may lead to a better measurement resolution which may open the possibility to make larger vortex flow meters. In addition, by inserting the one or more transducers 1828a and 1828b from outside the conduit body 1808, the need to reach inside the flow area is eliminated, which may also allow for the transducer's replaceability in the field without depressurizing the flow line. The drag sensors 1828 also may enable the measurement of flows below the minimum Reynolds number when the vortex shedding process may not be stable or regular, which may require that the drag transducer be capable of not only detecting the vortex induced dynamic drag pulsations but also be capable of measuring the static drag (similar to the Target flowmeter). To deduce the velocity off the static drag force, an estimated density value may be used. The drag sensors also may provide redundancy and self-verification in the Reynolds number range of regular stable vortex shedding by comparing the frequency of the dynamic part to the amplitude of the static one. The drag sensors 1828 also may enable determining the density of the fluid by measuring the average static drag amplitude and the frequency of the vortex pulsating drag. This may provide a practical way to measure the mass flow rate without the need to measure the temperature and/or the pressure of the fluid flow.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:
1. An apparatus comprising:
 a conduit body comprising a flow of at least one fluid therein;
 a ring-shaped bluff body disposed within the conduit body and configured to produce toroidal vortices within the flow of the at least one fluid;

at least one support attaching the ring-shaped bluff body to the conduit body; and at least one transducer disposed adjacent to the at least one support to detect drag induced pulsating mechanical effects on the at least one support.

2. The apparatus of claim 1, wherein the at least one transducer is shielded from contact with the flow of the at least one fluid.

3. The apparatus of claim 1, wherein the conduit body comprises a cavity adjacent to the at least one support.

4. The apparatus of claim 3, wherein the at least one transducer is disposed within the cavity.

5. The apparatus of claim 4, wherein the at least one transducer is accessible from outside the conduit body without depressurizing the apparatus and without the need to recalibrate it.

6. The apparatus of claim 1, wherein the at least one transducer detects a static drag on the ring-shaped bluff body.

7. The apparatus of claim 1, wherein the at least one support comprises:

a first end coupled to the conduit body; and a distal second end coupled to the ring-shaped bluff body, wherein the bluff body is substantially centered within the conduit body with respect to the same axis as the conduit body.

8. A flowmeter comprising:

a conduit body comprising a flow of at least one fluid therein;

a ring-shaped bluff body disposed within the conduit body and configured to produce toroidal vortices within the flow of the at least one fluid;

at least one support attaching the ring-shaped bluff body to the conduit body; and at least one transducer disposed adjacent to the at least one support to detect drag induced pulsating mechanical effects on the at least one support.

9. The flowmeter of claim 8, wherein the at least one transducer is shielded from contact with the flow of the at least one fluid.

10. The flowmeter of claim 8, wherein the conduit body comprises a cavity adjacent to the at least one support.

11. The flowmeter of claim 10, wherein the at least one transducer is disposed within the cavity.

12. The flowmeter of claim 11, wherein the at least one transducer is accessible from outside the conduit body without depressurizing the flowmeter and without the need to recalibrate it.

13. The flowmeter of claim 8, wherein the at least one transducer detects a static drag on the ring-shaped bluff body.

14. The flowmeter of claim 8, wherein the at least one support comprises:

a first end coupled to the conduit body; and a distal second end coupled to the ring-shaped bluff body, wherein the bluff body is substantially centered within the conduit body with respect to the same axis as the conduit body.

15. A method comprising:

attaching, with at least one support, a ring-shaped bluff body within a conduit body of a flowmeter having a flow of at least one fluid therein;

disposing, within the conduit body, at least one transducer proximate to the at least one support;

generating, at least in part with the ring-shaped bluff body, toroidal vortices; and detecting, with the at least one transducer, one or more drag induced pulsating mechanical effects on the at least one support mechanical effects.

16. The method of claim 15, further comprising shielding the at least one transducer from contact with the flow of the at least one fluid.

17. The method of claim 15, further comprising disposing the at least one transducer within a cavity in the conduit body.

18. The method of claim 17, further comprising accessing the at least one transducer from outside the conduit body without depressurizing the flowmeter and without the need to recalibrate it.

19. The method of claim 15, further comprising detecting, with the at least one transducer, a static drag on the ring-shaped bluff body.

20. The method of claim 19, further comprising determining a density of the flow of the at least one fluid.

* * * * *